(12) United States Patent
Ventura et al.

(10) Patent No.: US 12,323,663 B2
(45) Date of Patent: *Jun. 3, 2025

(54) SYSTEM FOR TARGETED DISPLAY OF CONTENT

(71) Applicant: SHARP NEC DISPLAY SOLUTIONS, LTD., Tokyo (JP)

(72) Inventors: Richard Ventura, La Grange Park, IL (US); Hiroyuki Kasuga, Lombard, IL (US); Steven Keith Platt, Chicago, IL (US)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,863

(22) Filed: Oct. 20, 2023

(65) Prior Publication Data

US 2024/0048809 A1 Feb. 8, 2024

Related U.S. Application Data

(63) Continuation of application No. 16/708,108, filed on Dec. 9, 2019, now Pat. No. 11,831,954.
(Continued)

(51) Int. Cl.
*H04N 21/47* (2011.01)
*G06F 3/0482* (2013.01)
(Continued)

(52) U.S. Cl.
CPC ........... *H04N 21/47* (2013.01); *G06F 3/0482* (2013.01); *G06N 20/00* (2019.01);
(Continued)

(58) Field of Classification Search
CPC ............ H04N 21/47; H04N 21/41415; H04N 21/4668; H04N 21/44218; H04N 21/4532;
(Continued)

(56) References Cited

U.S. PATENT DOCUMENTS

| 7,921,036 B1 | 4/2011 | Sharma et al. |
| 7,965,866 B2 | 6/2011 | Wang et al. |

(Continued)

FOREIGN PATENT DOCUMENTS

| CN | 101123547 A | 2/2008 |
| CN | 104243546 A | 12/2014 |

(Continued)

OTHER PUBLICATIONS

Extended European Search Report dated Oct. 12, 2022 in European Application No. 20738056.9.
(Continued)

*Primary Examiner* — Chenea Davis
(74) *Attorney, Agent, or Firm* — Sughrue Mion, PLLC

(57) ABSTRACT

Systems and methods relate to targeted display of media content, including a system that includes at least one processor configured to execute program instructions to implement a device and a content management system (CMS) and control the system to: send, by the device and to the CMS, a plurality of signals each triggering the CMS to play on a first display that is local to and separate from the device, a respective one of a plurality of media content of a playlist including a first media content, each of the plurality of signals sent at a different time while the first media content of the playlist is played on the first display, and ignore, by the CMS, each of the plurality of signals received prior to a first predetermined time of the played first media content of the playlist.

20 Claims, 12 Drawing Sheets

Related U.S. Application Data

(60) Provisional application No. 62/823,329, filed on Mar. 25, 2019, provisional application No. 62/791,089, filed on Jan. 11, 2019.

(51) Int. Cl.
| | |
|---|---|
| *G06N 20/00* | (2019.01) |
| *G06Q 30/0201* | (2023.01) |
| *H04N 7/173* | (2011.01) |
| *H04N 21/45* | (2011.01) |
| *H04N 21/462* | (2011.01) |

(52) U.S. Cl.
CPC ..... *G06Q 30/0201* (2013.01); *H04N 7/17318* (2013.01); *H04N 21/4532* (2013.01); *H04N 21/4622* (2013.01)

(58) Field of Classification Search
CPC .......... H04N 7/17318; H04N 21/4667; H04N 21/812; H04N 21/4223; H04N 21/4622; G06Q 30/0201; G06F 3/0482; G06N 5/025; G06N 20/00
See application file for complete search history.

(56) References Cited

U.S. PATENT DOCUMENTS

| | | | |
|---|---|---|---|
| 7,987,105 B2 | 6/2011 | McNeill et al. | |
| 8,238,607 B2 | 8/2012 | Wang et al. | |
| 8,472,672 B2 | 6/2013 | Wang et al. | |
| 9,177,195 B1 | 11/2015 | Marcheselli et al. | |
| 9,305,363 B2 | 4/2016 | Marcheselli et al. | |
| 9,384,407 B2 | 7/2016 | Wang et al. | |
| 9,569,786 B2 | 2/2017 | Shaw et al. | |
| 9,734,388 B2 | 8/2017 | Marcheselli et al. | |
| 9,747,497 B1 | 8/2017 | Sharma et al. | |
| 9,852,375 B2 | 12/2017 | Sanjay et al. | |
| 9,882,955 B2 | 1/2018 | Jamtgaard et al. | |
| 9,948,966 B1 | 4/2018 | Panchaksharaiah et al. | |
| 10,015,543 B1 | 7/2018 | Peterkofsky et al. | |
| 10,091,549 B1 | 10/2018 | Dalbec et al. | |
| 10,134,146 B2 | 11/2018 | Saleemi et al. | |
| 2002/0111892 A1 | 8/2002 | Sharp et al. | |
| 2003/0018797 A1* | 1/2003 | Dunning ............... | G06Q 30/02 709/217 |
| 2005/0114212 A1 | 5/2005 | Carrez et al. | |
| 2006/0248441 A1 | 11/2006 | Baumert et al. | |
| 2007/0022098 A1 | 1/2007 | Malik | |
| 2007/0214097 A1 | 9/2007 | Parsons et al. | |
| 2008/0090513 A1 | 4/2008 | Collins et al. | |
| 2008/0133342 A1 | 6/2008 | Criou et al. | |
| 2008/0255941 A1 | 10/2008 | Otto et al. | |
| 2009/0217315 A1 | 8/2009 | Malik et al. | |
| 2010/0313214 A1 | 12/2010 | Moriya et al. | |
| 2011/0016483 A1 | 1/2011 | Opdycke | |
| 2011/0040760 A1 | 2/2011 | Fleischman et al. | |
| 2012/0084340 A1 | 4/2012 | McCormack et al. | |
| 2012/0116892 A1 | 5/2012 | Opdycke | |
| 2012/0140069 A1 | 6/2012 | Ding et al. | |
| 2012/0210378 A1 | 8/2012 | McCoy et al. | |
| 2013/0111512 A1 | 5/2013 | Scellato et al. | |
| 2013/0304565 A1 | 11/2013 | Saccoman | |
| 2013/0339156 A1 | 12/2013 | Sanjay et al. | |
| 2013/0342689 A1 | 12/2013 | Sanjay et al. | |
| 2014/0018049 A1* | 1/2014 | Cannon ................. | H04W 4/16 455/414.1 |
| 2014/0032327 A1 | 1/2014 | Prakash et al. | |
| 2014/0040371 A1 | 2/2014 | Gurevich et al. | |
| 2014/0079282 A1 | 3/2014 | Marcheselli et al. | |
| 2014/0095306 A1 | 4/2014 | Avalos et al. | |
| 2014/0172504 A1 | 6/2014 | Duva et al. | |
| 2014/0310739 A1 | 10/2014 | Ricci et al. | |
| 2015/0025936 A1 | 1/2015 | Garel et al. | |
| 2015/0088661 A1 | 3/2015 | Bhaumik et al. | |
| 2015/0189368 A1 | 7/2015 | Lee et al. | |
| 2015/0199729 A1 | 7/2015 | Saccoman | |
| 2015/0281756 A1 | 10/2015 | Soon-Shiong et al. | |
| 2015/0310447 A1 | 10/2015 | Shaw | |
| 2016/0034945 A1 | 2/2016 | Lewis et al. | |
| 2016/0103592 A1 | 4/2016 | Prophete et al. | |
| 2016/0117718 A1 | 4/2016 | Hood et al. | |
| 2016/0119689 A1 | 4/2016 | Hood et al. | |
| 2016/0171547 A1 | 6/2016 | Sjölund et al. | |
| 2016/0189038 A1 | 6/2016 | Sanjay et al. | |
| 2016/0189181 A1 | 6/2016 | McClave et al. | |
| 2016/0239874 A1 | 8/2016 | Avalos et al. | |
| 2016/0267532 A1 | 9/2016 | Saccoman | |
| 2016/0379251 A1 | 12/2016 | Sanjay et al. | |
| 2016/0379261 A1 | 12/2016 | Avalos et al. | |
| 2017/0061469 A1 | 3/2017 | Garrity et al. | |
| 2017/0150198 A1 | 5/2017 | Barnett, Jr. | |
| 2017/0169464 A1 | 6/2017 | Miller | |
| 2017/0188078 A1 | 6/2017 | Cansino et al. | |
| 2017/0373950 A1 | 12/2017 | Szilagyi et al. | |
| 2018/0068344 A1 | 3/2018 | Sultzaberger | |
| 2018/0176645 A1 | 6/2018 | Reyes Sanchez et al. | |
| 2018/0184252 A1 | 6/2018 | Chew et al. | |
| 2018/0198543 A1 | 7/2018 | Perrin et al. | |
| 2018/0285469 A1 | 10/2018 | Hahn et al. | |
| 2018/0293249 A1 | 10/2018 | Tabares | |
| 2018/0293617 A1 | 10/2018 | Pittman | |
| 2018/0300761 A1 | 10/2018 | Pittman | |
| 2018/0365734 A1 | 12/2018 | Silva et al. | |
| 2019/0035007 A1 | 1/2019 | Yepez | |
| 2019/0044989 A1 | 2/2019 | Veeramani et al. | |
| 2019/0082003 A1 | 3/2019 | Moon et al. | |
| 2019/0141399 A1 | 5/2019 | Auxer et al. | |
| 2019/0188733 A1 | 6/2019 | Rao et al. | |

FOREIGN PATENT DOCUMENTS

| | | |
|---|---|---|
| JP | 2001-229084 A | 8/2001 |
| JP | 2002-106930 A | 4/2002 |
| JP | 2003-132362 A | 5/2003 |
| JP | 2004-159212 A | 6/2004 |
| JP | 2004-171151 A | 6/2004 |
| JP | 2004-536357 A | 12/2004 |
| JP | 2006-339780 A | 12/2006 |
| JP | 2009-175739 A | 8/2009 |
| JP | 2010-160780 A | 7/2010 |
| JP | 2011-8571 A | 1/2011 |
| JP | 2011-520304 A | 7/2011 |
| JP | 2011-233120 A | 11/2011 |
| JP | 2015-55924 A | 3/2015 |
| JP | 2016-71501 A | 5/2016 |
| JP | 2016-177410 A | 10/2016 |
| JP | 2018-97465 A | 6/2018 |
| KR | 10-1613038 B1 | 4/2016 |
| WO | 2013039542 A1 | 3/2013 |
| WO | 2013/151552 A1 | 10/2013 |

OTHER PUBLICATIONS

Office Action issued Jan. 21, 2021 in U.S. Appl. No. 16/708,043.
International Search Report in International Application No. PCT/JP2020/001624, issued on Apr. 21, 2020.
Communication dated Jul. 28, 2020, from the United States Patent and Trademark Office in U.S. Appl. No. 16/708,043.
Extended European Search Report dated Sep. 8, 2022 in European Application No. 20738639.2.
International Search Report in International Application No. PCT/JP2020/001625, issued on Apr. 21, 2020.
Office Action dated Sep. 6, 2022 issued by the Japanese Patent Office in Japanese Application No. 2021-561145.
Chinese Office Action issued Dec. 29, 2023 in Application No. 202080007317.1.
Chinese Office Action dated Nov. 30, 2023 in Application No. 202080007730.8.

(56) References Cited

OTHER PUBLICATIONS

Chinese Notice of Allowance dated Jun. 3, 2024 in Application No. 202080007730.8.

* cited by examiner

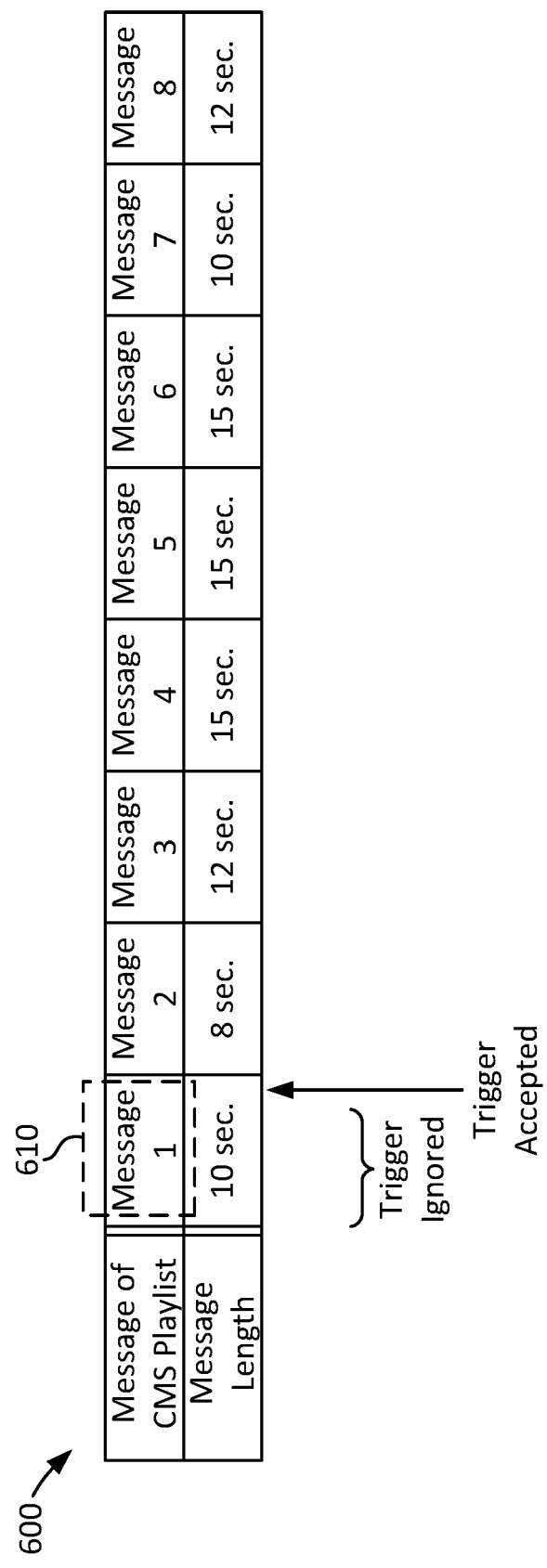
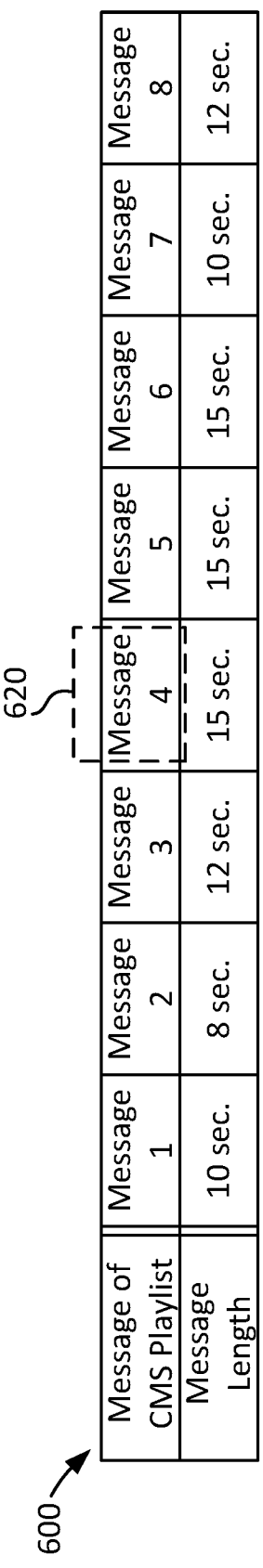
FIG. 10A
FIG. 10B

FIG. 10C 600→

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

630 (indicates Message 2 / 8 sec.)

FIG. 10D 600→

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

640 (indicates Message 3 / 12 sec.)

Triggers Ignored ← Trigger Accepted

| Message of CMS Playlist | Message 1 | Message 2 | Message 3 | Message 4 | Message 5 | Message 6 | Message 7 | Message 8 |
|---|---|---|---|---|---|---|---|---|
| Message Length | 10 sec. | 8 sec. | 12 sec. | 15 sec. | 15 sec. | 15 sec. | 10 sec. | 12 sec. |

650 (Message 7)

SYSTEM FOR TARGETED DISPLAY OF CONTENT

CROSS-REFERENCE TO RELATED APPLICATIONS

This application is a Continuation of U.S. application Ser. No. 16/708,108, filed on Dec. 9, 2019, which claims priority from U.S. Provisional Application No. 62/791,089, filed on Jan. 11, 2019, and U.S. Provisional Application No. 62/823,329, filed on Mar. 25, 2019, the disclosures of which are incorporated herein by reference in their entireties.

FIELD

This disclosure is related to the targeted display of media content, and more particularly the targeted display of media content using a rule set or an AI model.

BACKGROUND

Some prior systems attempt to provide targeted media content to viewers. However, there is complexity associated with the delivery of highly relevant, targeted media content. For example, there is a problem in managing and understanding the data that is required to determine which media content should be delivered to which individuals at what time and place. Moreover, there is a need to better understand the performance and productivity of entities that are displaying targeted media content, how various factors affect the performance and productivity, and how the performance and productivity can be enhanced.

SUMMARY

Some embodiments of the present disclosure solve the previously mentioned problems and other problems of background art.

Some embodiments of the present disclosure enable the targeted display of media content and the creation of new media content for targeted display. Some embodiments of the present disclosure enable the upload of data to be used in analysis to perform targeted display and media content creation, to be used to update rules or an AI model that is downloadable and used to perform targeted display of media content, and to be used in be analysis, visualization, and reporting.

In some embodiments, a system is provided. The system includes: at least one memory having program instructions stored therein; and at least one processor configured to execute the program instructions to implement a device and a content management system (CMS) and control the system to: send, by the device and to the CMS, a plurality of signals each triggering the CMS to play on a first display that is local to and separate from the device, a respective one of a plurality of media content of a playlist including a first media content, each of the plurality of signals sent at a different time while the first media content of the playlist is played on the first display, ignore, by the CMS, each of the plurality of signals received prior to a first predetermined time of the played first media content of the playlist, and in a case where one of the plurality of signals is received at a second predetermined time of the played first media content of the playlist, later than the first predetermined time, play, by the CMS and on the first display, one of the plurality of media content of the playlist, based on the one of the plurality of signals received.

In an embodiment, the at least one processor is further configured to control the system to: in a case where none of the plurality of signals is received at the second predetermined time and the one of the plurality of signals is received at the first predetermined time, play, by the CMS and on the first display, the one of the plurality of media content of the playlist, based on the one of the plurality of signals received.

In an embodiment, the at least one processor is further configured to control the system to: in a case where none of the plurality of signals is received at the first predetermined time and the second predetermined time, play, by the CMS and on the first display, other media content of the playlist, based on a position of the other media content within the playlist.

In an embodiment, the at least one processor is further configured to control the system to: connect, by the device, via a wide area network to a remote system, receive, by the device, a rule set or an artificial intelligence (AI) model from the remote system, select, by the device, the first media content based on applying first demographics data to the rule set or AI model, and cause, by the device and based on a first output of the rule set or AI model, the first display to display the first media content.

In an embodiment, the at least one processor is further configured to obtain customer demographics data as the first demographics data based on sensor data from at least one sensor, and apply the customer demographics data to the rule set or AI model.

In an embodiment, the at least one processor is further configured to obtain, by the device, data from at least one from among a mobile sensor, a radio frequency identification device, and a beacon.

In an embodiment, the system further includes: the at least one sensor, wherein the at least one sensor includes a first camera and a second camera, the first camera is located in a vicinity of the first display, and the second camera is located in a position, away from the first display.

In an embodiment, the at least one processor is configured to send, by the device and to the remote system, the customer demographics data.

In an embodiment, the at least one processor is configured to send, by the device and to the remote system, only a portion of the customer demographics data that is obtained by the at least one processor, such that an amount of the customer demographics data sent to the remote system by the at least one processor is less than a total amount of the customer demographics data obtained by the at least one processor.

In an embodiment, the at least one processor is further configured to receive, by the device and from the remote system, external data including at least one from among event data, weather data, and point of sale (POS) data, and select the first media content based on applying the first demographics data and the external data to the rule set or AI model.

In an embodiment, the at least one processor is configured to receive, by the device and from the remote system, an updated rule of the rule set, an updated rule set, or an updated AI model, that is updated based on the customer demographics data sent to the remote system, and is further configured to cause the first media content to be displayed on the first display, based on the updated rule, the updated rule set, or the updated AI model.

In an embodiment, the plurality of media content are stored in memory that is external to the device, and the at least one processor is configured to cause, by the device and based on the first output of the rule set or AI model, the first display to display the first media content that is stored in the memory that is external to the device.

In an embodiment, the CMS is connected by a local network with the device, the device is configured to receive the rule set or AI model from the remote system, select the first media content based on applying the first demographics data to the rule set or AI model, and send, based on the first output of the rule set or AI model, a first signal to the CMS, the first signal triggering the CMS to play the first media content on the first display, and the CMS is configured to receive the first media content from the remote system, store the first media content in memory of the CMS, and cause, based on the first signal from the device, the first display to display the first media content.

In an embodiment, the CMS is further configured to send to the device, the playlist including the first media content stored by the CMS, and the device is configured to send the first signal, based on the playlist being previously received by the device.

In some embodiment a method is provided, the method performed by a system including at least one memory having program instructions stored therein and at least one processor configured to execute the program instructions to implement a device and a content management system (CMS). The method includes: receiving, by the CMS and from the device, a plurality of signals each triggering the CMS to play on a first display that is local to and separate from the device, a respective one of a plurality of media content of a playlist including a first media content, each of the plurality of signals sent at a different time while the first media content of the playlist is played on the first display; ignoring, by the CMS, each of the plurality of signals received prior to a first predetermined time of the played first media content of the playlist; and in a case where one of the plurality of signals is received at a second predetermined time of the played first media content of the playlist, later than the first predetermined time, playing, by the CMS and on the first display, one of the plurality of media content of the playlist, based on the one of the plurality of signals received.

In an embodiment, the method further includes: in a case where none of the plurality of signals is received at the second predetermined time and the one of the plurality of signals is received at the first predetermined time, playing, by the CMS and on the first display, the one of the plurality of media content of the playlist, based on the one of the plurality of signals received.

In an embodiment, the method further includes: in a case where none of the plurality of signals is received at the first predetermined time and the second predetermined time, playing, by the CMS and on the first display, other media content of the playlist, based on a position of the other media content within the playlist.

In some embodiments, a device is provided. The device includes: a memory having program instructions stored therein; and at least one processor configured to execute the program instructions to control the device to: send a plurality of signals each triggering playing on a first display that is local to and separate from the device, a respective one of a plurality of media content of a playlist including a first media content, each of the plurality of signals sent at a different time while the first media content of the playlist is played on the first display, wherein each of the plurality of signals received prior to a first predetermined time of the played first media content of the playlist is ignored, and in a case where one of the plurality of signals is received at a second predetermined time of the played first media content of the playlist, later than the first predetermined time, one of the plurality of media content of the playlist is played on the first display, based on the one of the plurality of signals received.

In an embodiment, in a case where none of the plurality of signals is received at the second predetermined time and the one of the plurality of signals is received at the first predetermined time, the one of the plurality of media content of the playlist is played on the first display, based on the one of the plurality of signals received.

In an embodiment, in a case where none of the plurality of signals is received at the first predetermined time and the second predetermined time, other media content of the playlist is played on the first display, based on a position of the other media content within the playlist.

BRIEF DESCRIPTION OF THE DRAWINGS

Further features, the nature, and various advantages of the disclosed subject matter will be more apparent from the following detailed description and the accompanying drawings in which:

FIG. 10A is a diagram demonstrating a first part of an example sequence of interactions between an ALP system and a CMS of an embodiment.

FIG. 10B is a diagram demonstrating a second part of the example sequence of interactions between the ALP system and the CMS of the embodiment.

FIG. 10C is a diagram demonstrating a third part of the example sequence of interactions between the ALP system and the CMS of the embodiment.

FIG. 10D is a diagram demonstrating a fourth part of the example sequence of interactions between the ALP system and the CMS of the embodiment.

FIG. 10E is a diagram demonstrating a fifth part of the example sequence of interactions between the ALP system and the CMS of the embodiment.

DETAILED DESCRIPTION

Figure 1:
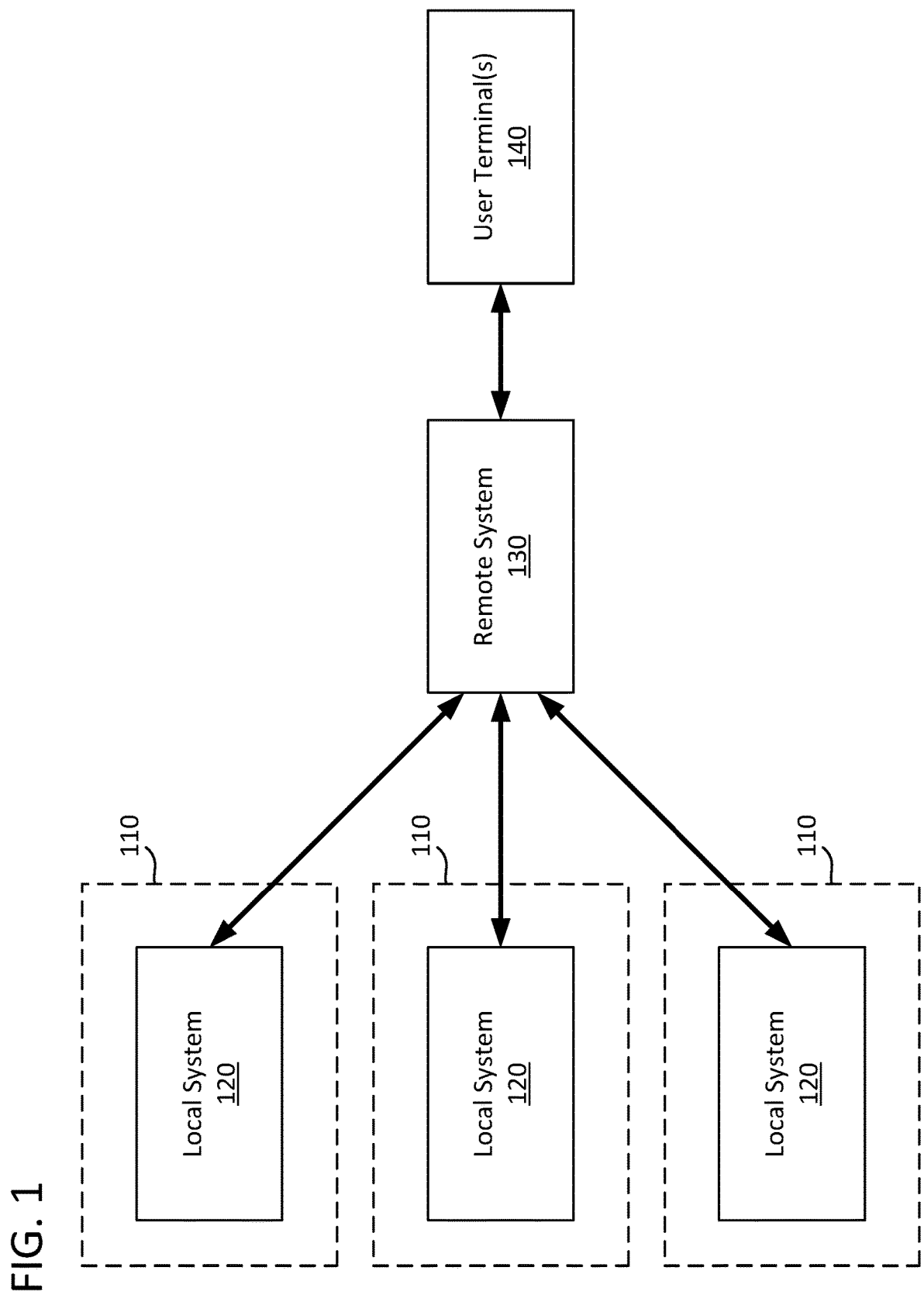
FIG. 1 illustrates an overview of a system of an embodiment.
Figure 2:
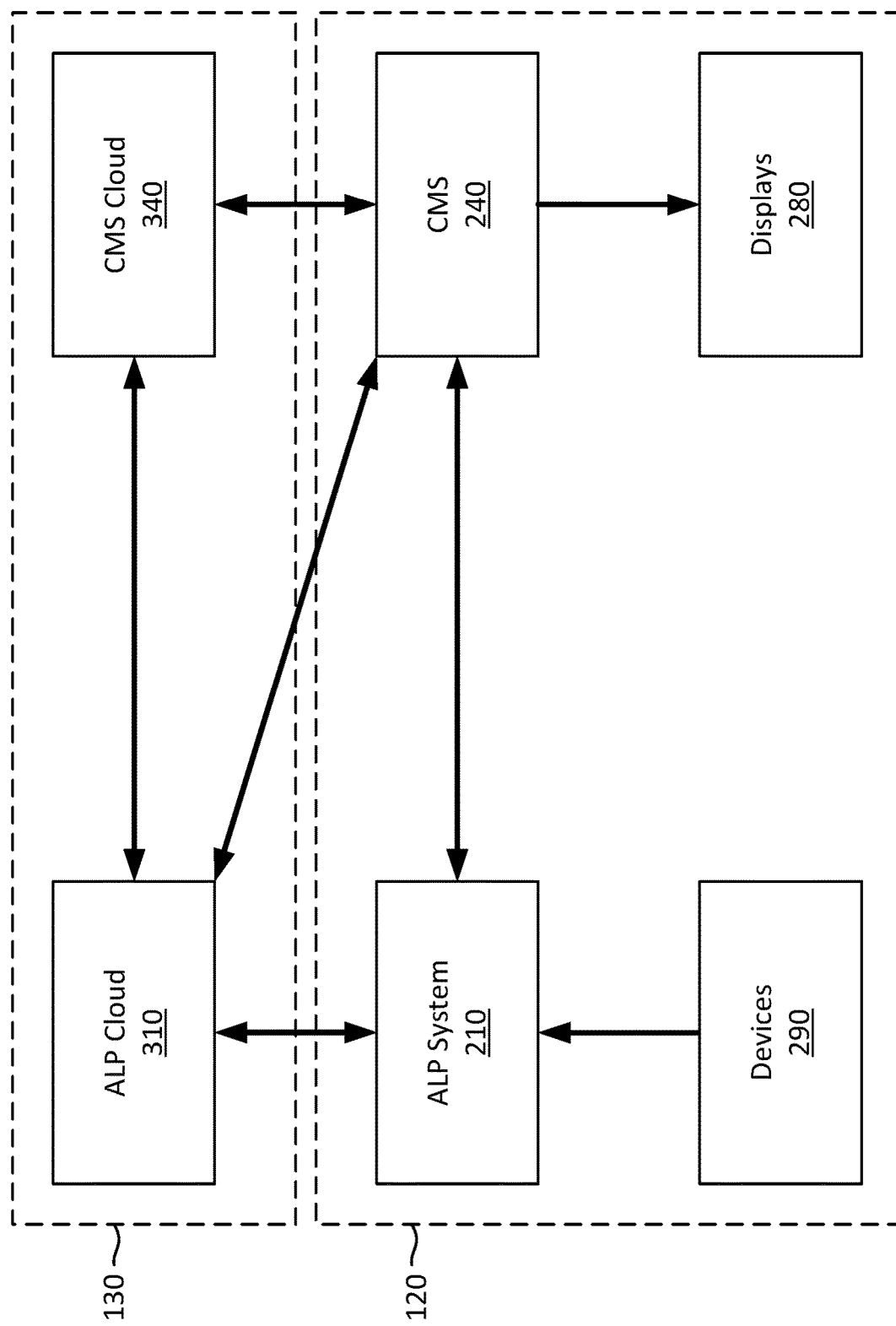
FIG. 2 illustrates a remote system and a local system of an embodiment.

FIG. 1 illustrates a system of an embodiment of the present disclosure. As illustrated in FIG. 1, the system comprises one or more local systems 120, a remote system 130, and one or more user terminals 140 that may be, for example, computing devices with displays. In an embodiment, each of the local systems 120 may be located in a respective location 110 (e.g. a store). In an embodiment, as illustrated in FIG. 2, each local system 120 may comprise an analytics learning platform (ALP) system 210, a content management system (CMS) 240, devices 290, and displays 280 that are digital displays. The remote system 130 may include, for example, an ALP cloud 310 and a CMS cloud 340.

The local system 120 and the remote system 130 may be in remote communication with the each other. For example, with reference to FIG. 2, the ALP cloud 310 of the remote system 130 may be in remote communication with the ALP system 210 and the CMS 240 of the local system 120, and the CMS cloud 340 of the remote system 130 may be in remote communication with the CMS 240 of the local system 120. The ALP system 210, CMS 240, devices 290, and displays 280 of the local system 120 may be in local communication with each other. For example, with reference to FIG. 2, the devices 290 may locally communicate with the ALP system 210, the ALP system 210 and the CMS 240 may locally communicate with each other, and the CMS 240 may further locally communicate with the displays 280. With reference to FIG. 2, the ALP cloud 310 and the CMS cloud 340 of the remote system 130 may be in remote communication with each other. Remote communication refers to, for example, any wide area network (e.g. the internet). Local communication refers to communication using local area network technologies without using remote communication. For example, local communication includes local area wired connections (e.g. coaxial, twisted pair, fiber optic, etc.) and local area wireless communication methods (e.g. Bluetooth, Wi-FI, Zigbee, etc.)

In embodiments, the ALP cloud 310 and the CMS cloud 340 may each be a respective cloud computing system implemented as a cloud server. In embodiments, the ALP cloud 310 and the CMS cloud 340 may be integrated together as a single cloud of the remote system 130, or have their functions divided between any number of separate cloud computing systems that may be included in the remote system 130. In embodiments, the ALP cloud 310 and the CMS cloud may alternatively be implemented outside a cloud computing system by, for example, a dedicated server (s).

With reference to FIG. 2, components of the remote system 130 (e.g. the ALP cloud 310 and/or the CMS cloud 340) may be configured to perform any number of the following example functions in embodiments: (1) receive data from external sources concerning weather and events; (2) receive data from the ALP system 210 concerning store count, crowd count, and demographics data; (3) receive data from retail sources or the ALP system 210 concerning point of sales (POS) and customer relationship management (CRM), inventory, and product catalog; (4) receive data from the ALP system 210 or the CMS 240, concerning proof that media content is played by at least one of the displays 280; (5) receive data concerning proof that media content has been sent to the CMS 240 from the remote system 130; (6) create and update a rule set or artificial intelligence (AI) model based on the data received from the external sources, the ALP system 210, and the retail sources, or based on an input from a user terminal(s) 140; (7) send the rule set or the AI model to the ALP system 210; (8) create new media content automatically by applying the data received from the ALP system 210, the external sources, and the retail sources to a same or different rule set or AI model stored in the ALP cloud 310, or create the new media content manually via an input on a user terminal(s) 140, the new media content including images, video, and/or text that is stored in memory of the remote system 130; (9) update the images, video, and/or text available in the memory of the remote system 130, based on an input on the user terminal(s) 140; (10) send the new media content to the CMS 240; (11) cause the CMS device to play the new media content; (12) send CMS playlist data to the local system 120, (13) send the plurality of media content, including the new media content, to the ALP system 210 or the CMS 240; (14) prepare and output a report to a user terminal(s) 140, based on the data received from the CMS 240, the ALP system 210, and the external sources, to the user terminal(s) 140; (15) report, on the user terminal(s) 140, the demographics information of the people who have watched the triggered media content for at least a specified time period on at least one of the displays 280; (16) report, on the user terminal(s) 140, the time people spent watching the triggered media content on at least one of the displays 280; (17) report, on the user terminal, how many times people watched the triggered media content for at least a specified time period on at least one of the displays 280; and (18) report the time people spent in certain areas covered by sensors connected to the ALP system 120.

In an embodiment, the ALP cloud 310 creates rules or an AI model, and further creates media content according to a user's manual instructions and/or Artificial Intelligence (AI) assistance. The ALP cloud 310 may send the rules (or AI model) created to the ALP system 210 to enable the ALP system 210 to trigger the playing of media content by using the rules (or AI model) in a rule engine. The rules (or AI model) may define requirements (e.g. age group, gender, weather, etc.) for specific media content to be played. The term "rule" may be a set of principles which enables systems to make decisions based on given input. The input and action performed may depend upon the system in which rules (or the AI model) are stored.

In an embodiment, the ALP cloud 310 may update the rules (or AI model) and/or create new rules (or AI model) and send the updated and/or new rules (or AI model) to the ALP system 210 to update the set of rules (or AI model) stored in the ALP system 210. In an embodiment, the ALP cloud 310 may create the rules (or AI model) based on data received by the ALP cloud 310. Such data may include data received from the local system 120, such as from ALP system 210, and data received external from the local system 120. In an embodiment, the rules (or AI model) sent to the ALP system 310 may be created or updated using machine learning techniques performed by the ALP cloud 310.

In an embodiment, the ALP cloud 310 may create new media content using, for example, a set of rules or AI model stored in the ALP cloud 310. The ALP cloud 310 may send the media content created to the CMS 240 via the CMS cloud 340 to be stored by the CMS 240. Alternatively, the ALP cloud 310 may send the media content created to the CMS 240 directly to be stored by the CMS 240.

Figure 3:
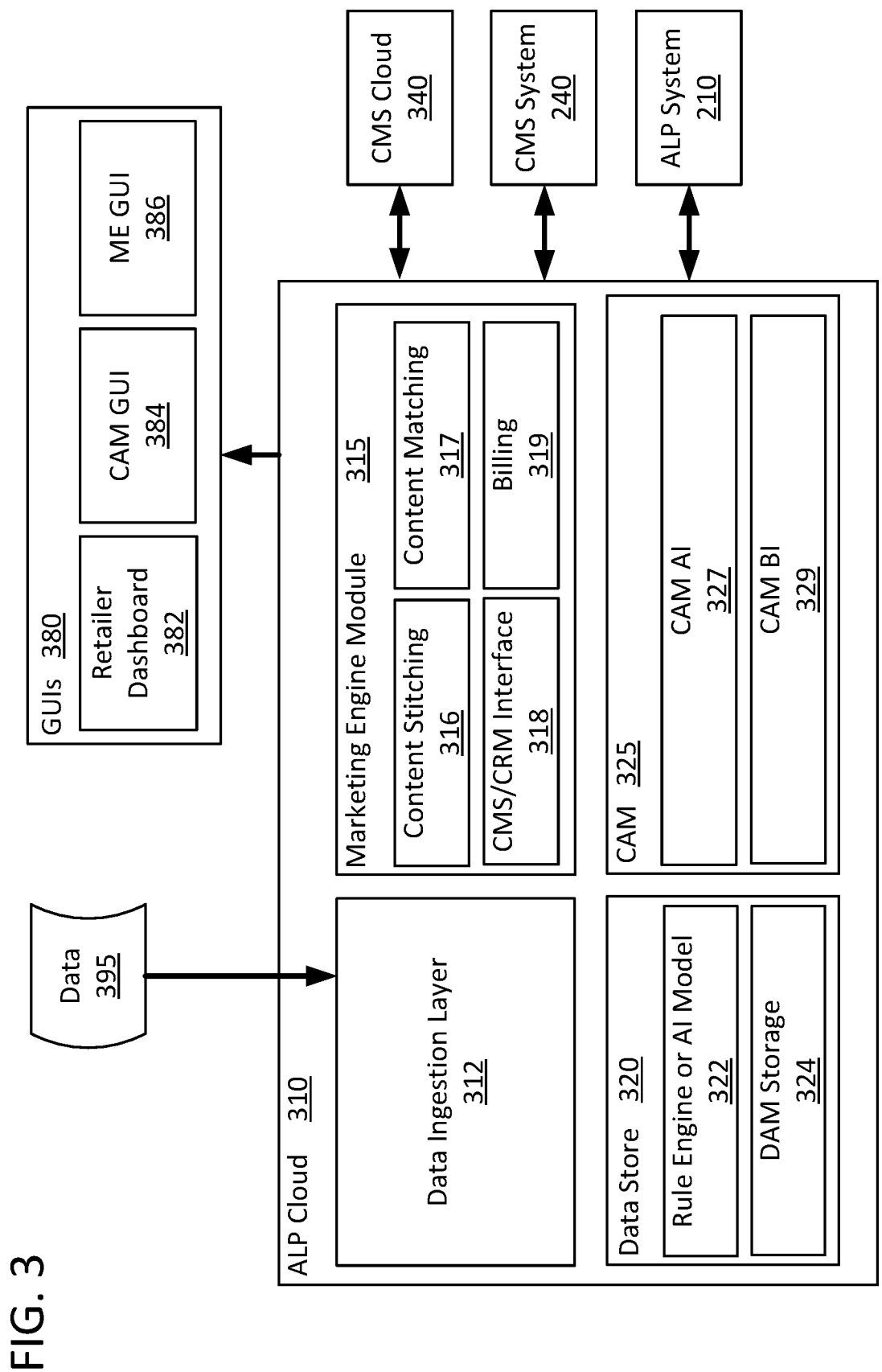
FIG. 3 is a diagram illustrating example functions of an ALP cloud of an embodiment.

With reference to FIG. 3, the ALP cloud 310 is described in further detail below. The ALP cloud 310 may comprise at least one processor and memory comprising computer programming code configured to cause the at least one processor to perform the functions of the ALP cloud 310.

FIG. 3 is a diagram illustrating example functions of the ALP cloud 310 performable by at least one processor of the ALP cloud 310 with memory of the ALP cloud 310. The memory may include computer program code configured to cause the at least one processor to perform the functions. As illustrated in FIG. 3, the ALP cloud 310 may provide modules of a data ingestion layer 312, a marketing engine (ME) module 315, data store 320, and customer analytics module (CAM) 325. The ME module 315 may include functions of content stitching 316, content matching 317, CMS/CRM interface 318, and billing 319. The data store may be memory that includes a rule engine or AI model 322, and includes a digital asset management (DAM) storage 324. The CAM 325 may include a CAM AI module 327 and a CAM BI module 329.

The data ingestion layer 312 may receive data 395 from different data sources (e.g. the local system 120 and external sources) as well as cleanse the data 395.

The CAM 325 may function as the analytics components of the remote system 130. The CAM 325 may encompass both in-store reporting and a big data application. Big data describes data sets that are large (both structured and unstructured) and complex, requiring advanced technologies to store, manage, analyze, and visualize information of value. In an embodiment, the CAM 325 may function to (1) enable retailers to measure and monitor store performance, understand consumer behavior, and implement beneficial actions; (2) perform analytic processing to optimize media content delivery to digital devices (e.g. displays 280) and measure impact, and (3) provide analytic support for the ME module 315. In an embodiment, the CAM 325 may import, manage, and store retailer and third-party data (both structured and unstructured). Various reporting, analytic models, and AI may process and analyze data to produce information and knowledge that enables decisions and actions to be undertaken to enhance the ability of retailers to understand the needs of their customers, predict their wants and demands, deliver relevant messages, measure and monitor impact, and otherwise aid in optimizing their use of resources.

In an embodiment, the CAM 325 may perform analysis using the rule engine or AI model 322, and perform functions of data mining and reporting. In an embodiment, by using the rule engine or AI model 322, the CAM 325 may provide information of value by a cycle of: converting data to information, to knowledge, to decisions, and then into actions that enable retailers to understand the needs of their customers, predict their wants and demands, and optimize their use of resources. Accordingly, the CAM 325 may accomplish the challenging task of managing and gaining insights from data, thereby securing a key competitive advantage.

In an embodiment, the CAM AI 327 may perform data analytics on real time data for media content creation and/or creating and updating an AI model or rules to be used by the ALP system 210, by applying data 395 ingested by the data ingestion layer 312 to the rule engine or AI model 322. The CAM AI 327 may interface with data ingestion layer 312 to receive real time data (hot path). The CAM 325 may also have an interface with the ME module 315. The CAM AI 327 may generate media content tags by applying the information from the data ingestion layer 312 to the rule engine or AI model 322, and provide these tags to the ME module 315 for further processing. For example, the tags may be applied to the ME module 315 to perform media content optimization by creating and selecting relevant media content for display. In an embodiment, the CAM AI 327 may create the tags as recommendations for creation of targeted media content to enhance in-store customer experience and provide promotional effectiveness that leads to more dollar sales per customer. In an embodiment, functions of the CAM 325 may be visualized and controlled via a CAM GUI 384 of the GUIs 380 that may be displayed on user terminal(s) 140 by the remote system 130.

The CAM BI 329 may generate various types of reports. Each of these report may be used to provide insights to individuals such as, for example, store retailers and marketers. The reports may be implemented with a retailer dashboard 382 and/or CAM GUI 384 of GUIs 380 that may be displayed on user terminal(s) 140 by the remote system 130. The reports may include reporting on, for example, store traffic, customer wait-time, store conversion rates, store productivity rates, and variances thereof. Additionally or alternatively, the reports may include reporting on, for example, customer insights (e.g. viewing analytics information) about customers in-store, zone traffic, inventory and operational enhancements, impression counts, opportunity to see (OTS) counts, media content viewer rate, media content efficiency rate, media content conversion rate, the time people spent in certain areas covered by sensors, and information concerning relationships between radio frequency identification (RFID) and display messages.

Store conversion refers to, for example, the number of individuals (e.g. customers) present in a particular store. Store productivity refers to, for example, revenue divided by a number of individuals present in a particular store. The reporting on demographics information may include the demographics information for the people who have watched a triggered media content for at least a predetermined time frame. The impression counts may be counts on many times people watched a triggered media content for at least a predetermined time period. The OTS count may be a count of people who were determined to have had an opportunity to see media content on a display 280. For example, a count of people in front of display 280 that have both watched and not watched media content on the display 280.

The operational enhancements refer to, for example, detecting slow-moving inventory and detecting inventory approaching the end of its useful life. In an embodiment, the rule engine or AI model 322 may be used by the CAM AI 327 or the CAM BI 329 so as to determine and output operational enhancements based on the data 395 ingested by the data ingestion layer 312 and the ALP cloud 310, and the CAM BI 329 may cause the operational enhancements to be reported on one of the GUIs 380. For example, the ALP cloud 310 may recommend a specified inventory or promotion as an operational enhancement. Accordingly, some embodiments of the present disclosure may solve the problems retailers face in actively monitoring and promoting short-lived (like milk) and slow-moving product to maximize margins. Additionally, some embodiments of the present disclosure may avoid on-demand inventory not being managed well which may avoid a shortfall of inventory during peak-sale time periods, and may avoid poor inventory forecasting which may avoid reduced customer satisfaction resulting in downfall in the sale of products. In an embodiment, the CAM AI 327 or the CAM BI 329 may run the rule engine or AI model 322 on any periodical basis or any other basis to provide operational enhancements and other analytics. For example, the rule engine or AI model 322 may be run on a nightly or weekly basis.

The ME module 315 may store assets and static messages in the DAM storage 324. The assets may include audio, video, still photography, logo graphics, animations, etc., and similar elements. In an embodiment, the assets may be used as components to create media content that is used as finished advertising spots. The ME module 315 may create new media content by, for example, auto-generating them with the assets and static messages stored in the DAM storage 325, based on analytical insights from data ingested by the ALP cloud 310 and instructions. For example, the ME module 315 may auto-generate the new media content based on the media content tags, outputted by the rule set or the AI model 322 of the CAM AI 327, being used as recommendation. In an embodiment, after receiving a media content tag, the ME module 315 may, by using the content matching 317 function, determine whether media content already exists in the ALP cloud 310, the CMS system 240, and/or the CMS cloud 340 that matches the recommendation signaled by the media content tag and, if there is no matching media content, create new media content per the recommendation.

The creation of media content may be performed using the functions of content stitching 316 and content matching 317. Content stitching 316 may include combining different assets and/or static messages into a single new media content. Content matching 317 may include matching analytic input and guidance issued by the CAM 325 to determine the new media content to be created and/or the media content to played by the displays 280. Functions of the ME module 315 (e.g. media content creation) may be visualized and controlled via the ME GUI 386 of the GUIs 380 that may be displayed on a user terminal(s) 140 by the remote system 130. For example, a user may create and manage media content manually with the ME module 315, via the ME GUI 386.

The ME module 315 may deliver the new media content to the CMS 240. Alternatively, if there is matching media content, the ME module 315 may not create new media content and may send the matching media content to the CMS 240 if the CMS 240 already does not have the matching media content.

Figure 4:
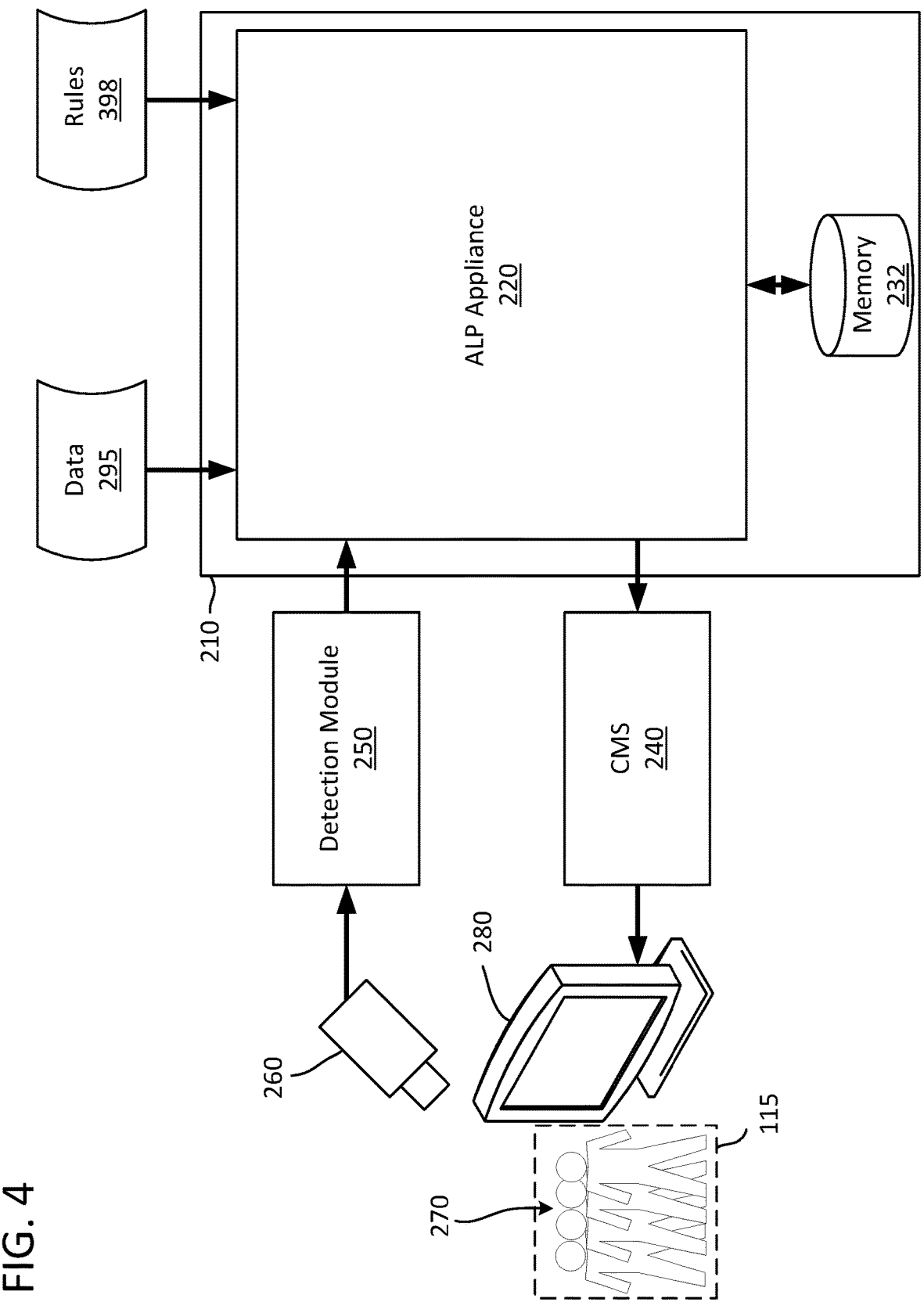
FIG. 4 is a diagram illustrating an ALP system of an embodiment and connected components.

With reference to FIGS. 2 and 4, components of the local system 120 (e.g. the ALP system 210 and/or the CMS 240) may be configured to perform any number of the following example functions in embodiments: (1) receive data from devices 290 that may include sensors and POS devices; (2) send the data from the devices 290 to the ALP cloud 310; (3) receive and store a rule set or AI model from the ALP cloud 310; (4) receive the data 295 from the external sources via the ALP cloud 310; (5) receive CMS playlist data from the ALP cloud 310 or the CMS cloud 340; (6) apply the data from the sensors, the data from the POS devices, the data 295 from the external sources, and the CMS playlist data to the rule set or the AI model received and stored; (7) select media content from the plurality of media content and a display from the displays 280, based on an output of the rule set or the AI model received and stored; and (8) output a trigger to play the media content selected on the display of the displays 280 selected.

For example, in an embodiment, the ALP system 210 determines what media content stored in the CMS 240 is to be played on one or more of the displays 280, wherein the determination is based on the ALP system 210 obtaining data and applying the data to rules 398 or an AI model stored in the ALP system 210.

With reference to FIGS. 2 and 4, the ALP system 210 may comprise an ALP appliance 220 and memory 232. The ALP appliance 220 may include at least one processor and memory. In an embodiment, the ALP appliance 220 may download the rules 398 or the AI model from the ALP cloud 310, and further receive data from the devices 290, which may be stored in memory 232.

The devices 290 may include, for example, one or more cameras 260 that send video data (e.g. camera images) to the ALP system 210 or the detection module 250. The devices 290 may also include, for example, mobile sensors, RFID, and beacons that provide sensor data to the ALP system 210 that the ALP system 210 may send to the ALP cloud 310 and/or apply to the stored rules 398 or the AI model. Such sensor data may also be received and used by the detection module 250 to perform its detection functions. Mobile sensors may be, for example, devices that detect MAC addresses of mobile devices in a detection area to count the number of devices as a traffic count. Beacons may be, for example, a Bluetooth Low Energy (BLE) device that broadcasts a signal which can be identified by other BLE devices in its vicinity. Beacons can be deployed individually or as a network. The devices 290 may also include POS devices which provide POS data to the ALP system 210 that the ALP system 210 may send to the ALP cloud 310 and/or apply to the stored rules 398 or the AI model.

As illustrated in FIG. 4, one or more of the cameras 260 of the devices 290 may be positioned nearby or integrated with one or more of the displays 280 to capture images of individuals 270 that may be viewing the one or more of the displays 280. Some of the cameras 260 may also be positioned away from the displays 280 at, for example, positions other than viewing positions of the displays 280. Each of the areas that are detected by the sensors (e.g. cameras 260), of the devices 290, may be a part of a respective specified zone 115 of a location 110, wherein the location 110 may have only one zone 115 or a plurality of zones 115. In an embodiments, one or more of the sensors may be directed to a single zone 115 of a location 110. In embodiments, some of the zones 115 may be visibility zones in which individuals 270 may view a display 280, and some of the zones 115 may be audibility zones in which individuals 270 may hear media content being played. In embodiments, one or more displays 280 may be inside or outside the zones 115. According to embodiments, each local system 120 may perform detection in a plurality of the zones 115 of a respective location 110, wherein any number of the zones 115 may be viewing positions of the displays 280 of the local system 120.

Figure 5:
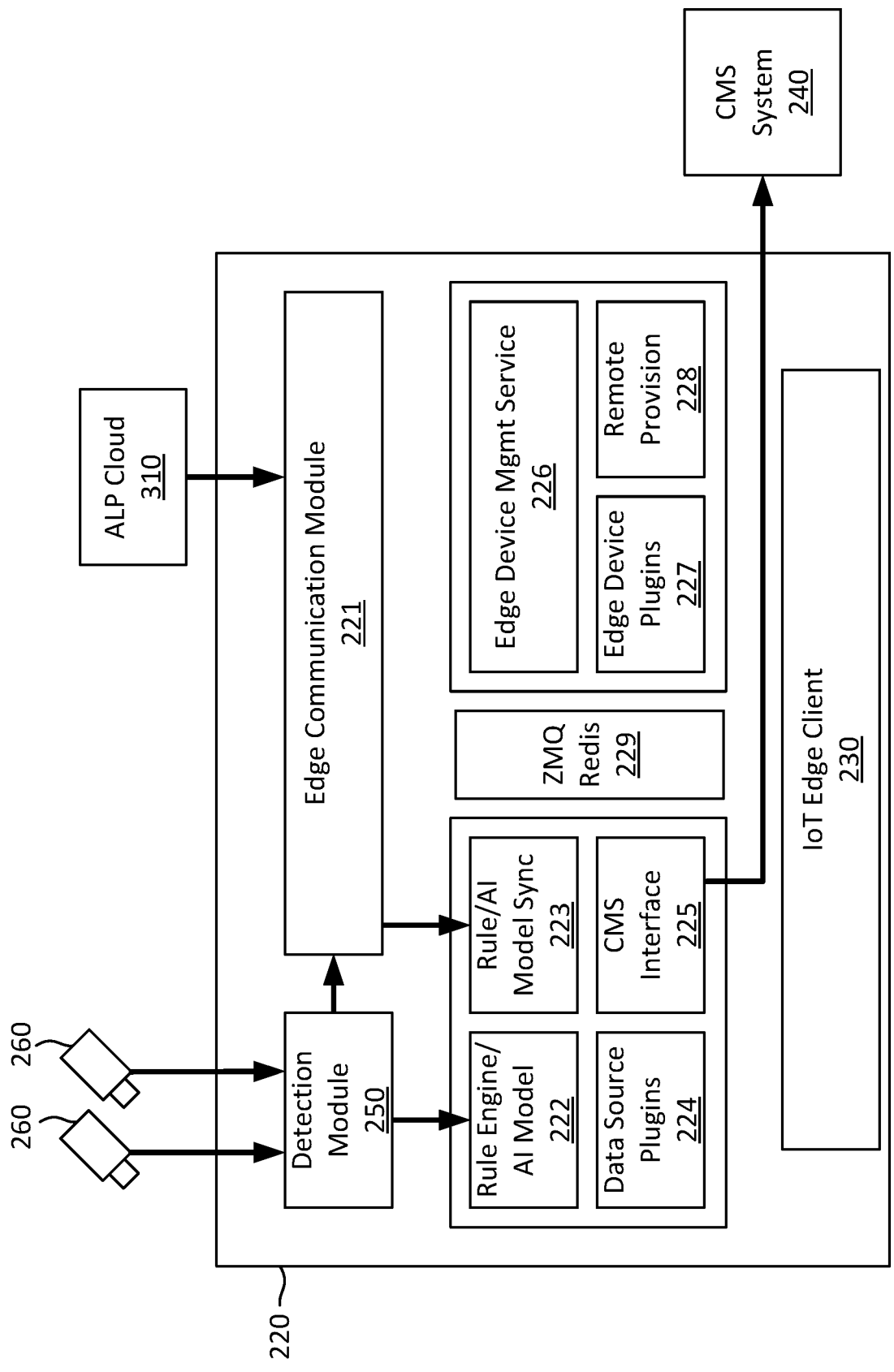
FIG. 5 is a diagram illustrating examples functions of an ALP appliance of an embodiment.

The ALP system 210, or a device communicating therewith, may process the video data to obtain demographics data (e.g. age group, gender, etc.) of one or more individuals 270 that is included in the video data. For example, the detection module 250 may process the video data to obtain the demographics data. The detection module 250 may also process the video data to obtain, for example, crowd count and dwell time of store traffic, orientation or line of sight of faces of the individuals 270. In an embodiment, the detection module may generate analytics data containing at least a date. The detection module 250 may be implemented by at least one processor with memory external to the ALP system 210, as illustrated in FIG. 4, or implemented by the ALP system 210 as illustrated in FIG. 5. The detection module 250 may include facial detection or recognition software. In order to maintain customer anonymity, the detection module 250 may perform detection functions, without recognition functions, to obtain anonymous video analytics. Demographics data refers to the characteristics that define who a target audience is. For example, characteristics such as age, gender, ethnicity, cultural background, religious or political affiliations, economic status, family background, and group memberships may be the demographics data obtained. Dwell time refers to a measurement of how long individuals are present in front of a display 280.

The ALP system 210 may apply the demographics data to the stored rules 398 or AI model to determine which content stored in the CMS 240 is to be played on one more of the displays 280. In some embodiments, the ALP system 210 may also download data 295 from the ALP cloud 310 and apply it to the stored rules 398 or the stored AI model. The data 295 downloaded may include, for example, event data, weather data, and POS data. Event data may be, for example, data about past and/or future local events, sports games (e.g. the results of the games), etc.

After reaching a determination of which content is to be played, the ALP system 210 may send a signal to the CMS 240 to play the content on one or more of the displays 280. The signal may be, for example, an instruction that triggers one or more specific media content of the media content to play.

In some embodiments, the ALP system 210 may also upload data to the ALP cloud 310 for analysis, reporting, rule set or AI model updating, and other uses by the ALP cloud 310. The data uploaded may include all or some of the information obtained by the detection module 250, all or some of the other information obtained by the ALP appliance 220.

FIG. 5 illustrates example functions of the ALP appliance 220 performable by at least one processor of the ALP appliance 220 with memory (e.g. memory 232) of the ALP system 210. The memory may include computer program code that is configured to cause the at least one processor to perform the functions. As illustrated in FIG. 5, the ALP appliance 220 may provide modules of a detection module 250, edge communication module 221, rule engine/AI model 222, rule sync 223, data source plugins 224, CMS interface 225, edge device management service 226, edge device plugins 227, remote provision 228, ZMQ and Redis 229, and Internet of Things (IoT) edge client 230.

As illustrated in FIG. 5, the detection module 250 may be implemented with the ALP appliance 220 rather than as a separate component as illustrated in FIG. 4.

The edge communication module 221 may be a module for communication with the remote system 130, including the ALP cloud 310 and the CMS cloud 340. For example, the ALP appliance 220 may retrieve new or updated rules or a new or updated AI model using the edge communication module 221. The ALP appliance may also upload data to the ALP cloud 310 using the edge communication module 221.

The ALP appliance 220 may implement the new rules/AI model with the rule engine/AI model 222 used to determine content to be played, and may update the rule engine/AI model 222 by synchronizing the rule engine/AI model 222 with new or updated rules/AI model received by the edge communication module 221. In an embodiment, the rule engine/AI model 222 may be ran with a limited set of data including, for example, a limited set of demographics data and a limited set of external data. It should be appreciated that the ALP cloud 310 of the remote system 130 may receive data from multiple local systems 120 and also receive external data from outside the system. Accordingly, unlike some embodiments of the ALP cloud 310 and its rule engine or AI model 322, the ALP appliance 220 may not function as a big data analytics solution in some embodiments.

The data source plugins 224 and the edge device plugins 227 may be plugins for retrieving data from devices 290 including, for example, sensors, beacons, and RFID. The CMS interface 225 may interface the ALP appliance 220 with the CMS 240.

The ALP appliance 220 may include the edge device management service 226, edge device plugins 227, and remote provision 228 to accomplish the function of device management. For example, the edge device management service 226 may be used to update the other functions of the ALP appliance 220 including, for example, data source plugins 224 and the rule engine/AI model 222. Also, the remote provision 228 may be used for remote login to the ALP appliance 220 for troubleshooting and management of the ALP appliance 220.

The ZMQ and Redis cache may be used by the ALP appliance 220 to ingest and store data from different sources (e.g. the ALP cloud 310, devices 290, and detection module 250) for further processing.

The IoT edge client 230 may function as a machine to machine (M2M) client and as a pipeline for sending data, including detection module data and data from devices 290 to the ALP cloud 310.

With reference to FIG. 2, the CMS 240 may be a system that downloads media content from the ALP cloud 310 and/or the CMS cloud 340, stores the media content in memory of the CMS 240, and causes at least one display of the displays 280 to play at least one media content of the media content, based on the signal from the CMS 240. The CMS 240 may comprise at least one processor and memory comprising computer programming code configured to cause the at least one processor to perform the functions of the CMS 240.

In an embodiment, the CMS 240 may send a proof of delivery (PoD) notification to the ALP cloud 310 indicating that the CMS 240 has received the content from the ALP cloud 310 and/or the CMS cloud 340. The CMS 240 may send the PoD notification directly to the ALP cloud 310 or to the ALP cloud 310 via the CMS cloud 340. In an embodiment, the CMS 240 may send the PoD notification to the ALP system 210, and the ALP system 210 may send the PoD notification to the ALP cloud 310. In an embodiment, the CMS 240 may send information to the ALP system 210 that indicates a list of the media content stored in the memory of CMS 240. The frequency or timing when the CMS 240 sends such information to the ALP system 210 may be set at the CMS 240, and such sending of information can be used as an inventory check of the CMS 240. In an embodiment, the CMS 240 may send the information once a day. In an embodiment, the CMS 240 may send a proof of play (PoP) notification to one or more of the ALP system 210, the ALP cloud 310, and the CMS cloud 340, the PoP notification indicating that media content has been played on at least one of the displays 280. For example, the PoP may be a reporting mechanism in which logs are used to show that media content (e.g. an advertisement) actually played back on one or more of the displays 280. In an embodiment, the PoP notification may include at least a date and time of play of media content, and an ID of the media content played.

Figure 6:
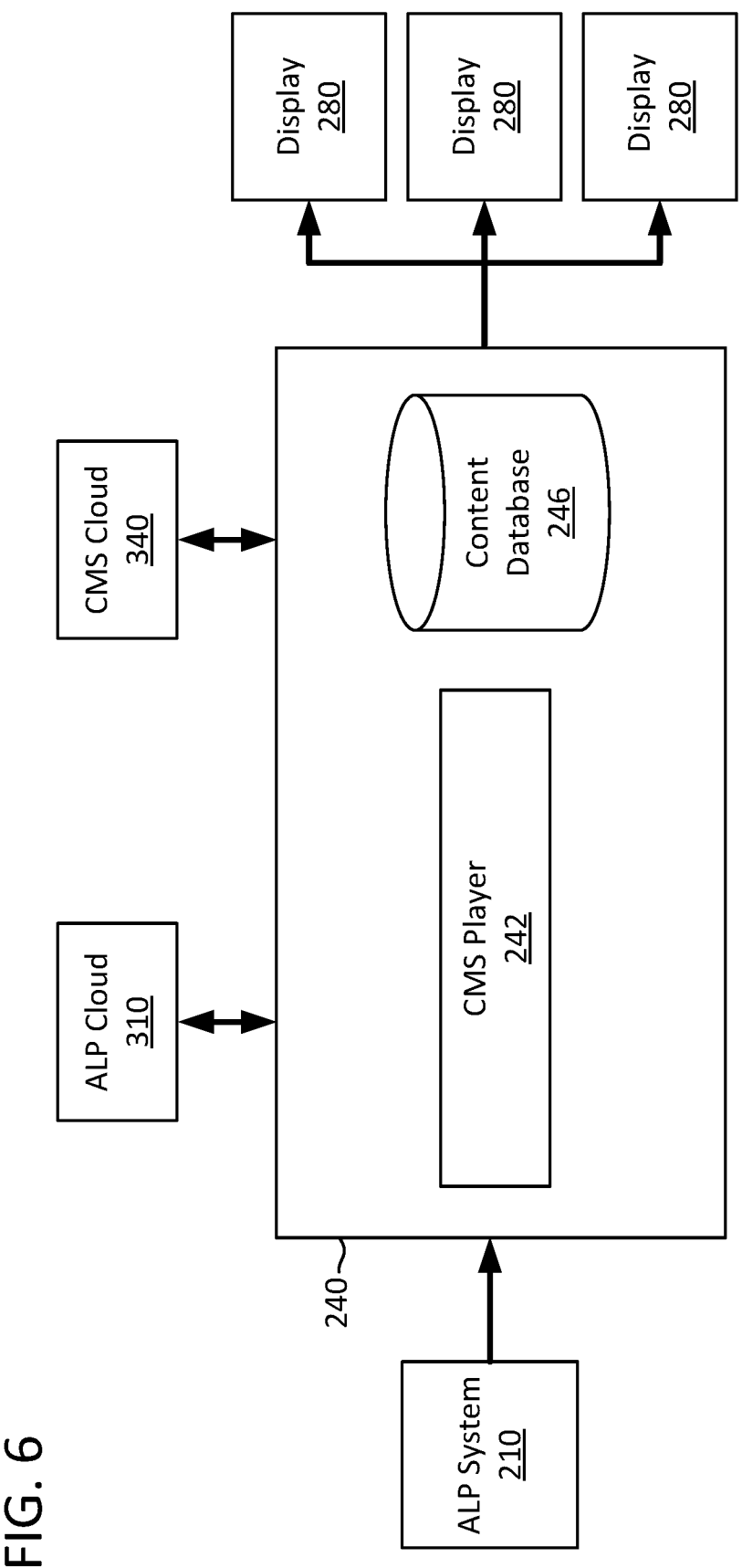
FIG. 6 is a diagram illustrating a CMS of an embodiment and connected components.

FIG. 6 illustrates an example embodiment of the CMS 240, wherein the CMS 240 comprises at least one CMS player 242 and a content database 246. The CMS player 242 may include at least one processor and memory comprising computer program code configured to cause the at least one processor to perform the functions of the CMS 240. The content database 246 may be memory that includes the media content that the CMS player 242 may cause to play on one or more of the displays 280.

Details of use and generation of the AI models and rules of the present disclosure are described below.

The AI models of the present disclosure may be built over an understanding of the relationships between various data points, as determined by analytical processes. AI models of the present disclosure may be built and updated using machine learning processes. For example, in an embodiment, the ALP cloud 310 may configured to run machine learning processes to build and update an AI model used by the ALP cloud 310 and an AI model or rule set used by the ALP system 210. The machine learning processes may use supervised or un-supervised learning techniques based on the kind of data inputted to the AI models.

Figure 7:
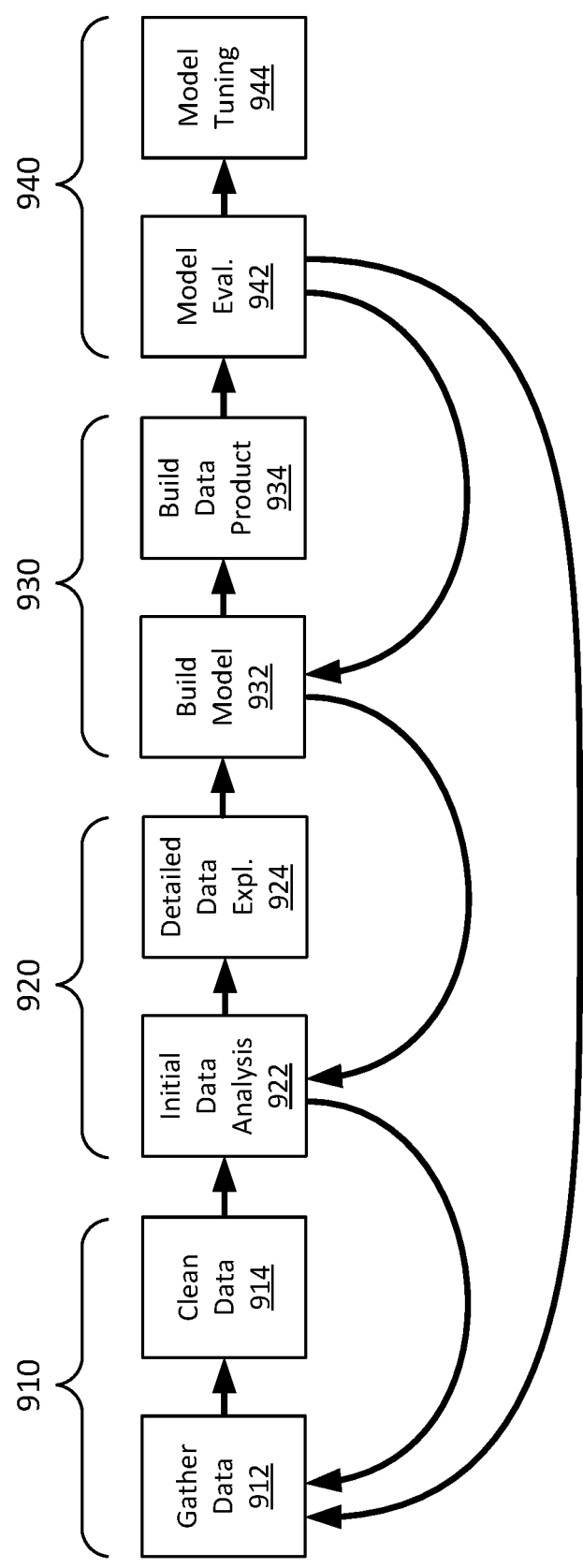
FIG. 7 is a diagram illustrating a machine learning process flow of an embodiment.

As illustrated in FIG. 7, the machine learning process flow may include a plan segment 910, an explore segment 920, a build segment 930, and an evaluate segment 940. The plan segment 910 may accomplish identifying the input data and framing the problem-solving approach. For example, the plan segment 910 may include a gather data step 912 and a clean data step 914. The explore segment 920 may accomplish assessing data structure and creating hypotheses, sample data, checking the statistical properties of the sample, and performing statistical tests of hypotheses. For example, the explore segment 920 may include an initial data analysis step 922 and a detailed data exploration step 924. The build segment 930 may accomplish understanding technicalities of each algorithm and how it works on a particular set of data, and ensuring that the model satisfies findings in the initial data analysis step 922. For example, the build segment 930 may include a build model step 932 and a build data product step 934. The evaluate segment 940 may accomplish applying methods to validate the created model by, for example, evaluating the models ability to perform and tuning the model. For example, the evaluate segment 940 may include a model evaluation step 942 and a model tuning step 944. In an initial phase of the model evaluation step 942, the AI model may target to maximize the lift with respect to, for example, impression, dwell time, conversion rate, and productivity. At further phases of the model evaluation step 942, the AI model may target to maximize the lift for other aspects including, for example, impression quality, opportunity to see (OTS), SNS review, and engagement level.

Figure 9:
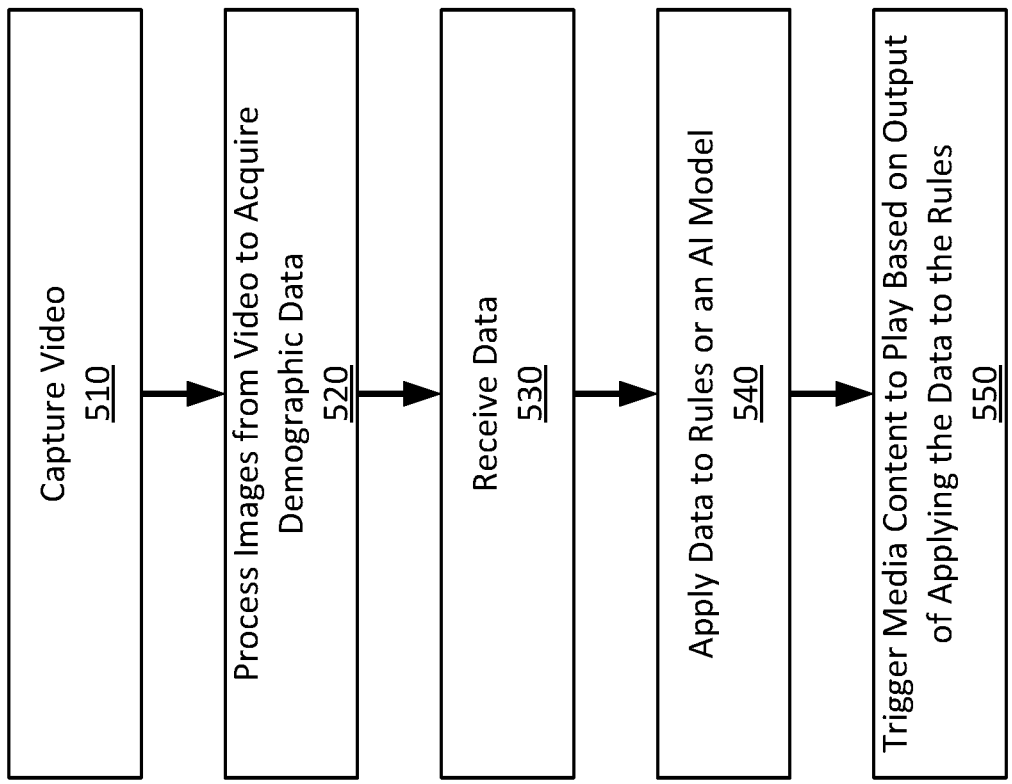
FIG. 9 is a diagram illustrating a method of the present disclosure.

As illustrated in FIG. 9, the process may loop back to the gather data step 912 from the initial data analysis step 922, the process may look back to the initial data analysis step 922 from the build model step 932, the process may loop back to the build model step 932 from the model evaluation step 942, and the process may look back to the gather data step 912 from the model evaluation step 942.

AI models and rule sets of the present disclosure may be configured to accept various inputs and to output information. For example, AI models and rules sets of the present disclosure may accepts inputs such as demographics information, store traffic information, crowd count information, wait time, weather information, point of sales (POS) information, catalog information, inventory information, CRM information, event information, display location information, store information, retailer digital data, proof of play or proof of delivery information, media content tags, sensor data, promotion data.

Demographics data refers to the characteristic of individuals 270 that define who a target audience is. For example, characteristics such as age, gender, ethnicity, cultural background, religious or political affiliations, economic status, family background, and group memberships may the demographics data obtained. In embodiments, the detection 250 module may obtain the demographics data. The demographics data may be applied to the rules or AI model to generate analytical reports based on demographics of people visiting a location 110, and to generate or trigger a targeted media content based on the demographics and other related details.

Store traffic information may be, for example, information that comes from a camera 260 placed at an entrance of a location 110 concerning the amount of people entering the location 110. Crowd count information may be, for example, a count of people in a specified zone 115 of a location 110 (e.g. in front of a display 280). Store traffic information and crowd count information may be applied to the rules or AI model to generate analytical reports based on demographics of people visiting a location 110, and to generate or trigger a targeted media content based on the demographics and other related details.

Wait time may be, for example, data about how long individuals 270 have been waiting in a queue of any zone 115 of a location 110. Wait time data may be applied to the rules or AI model to generate analytical reports based on demographics of people visiting a location 110, to generate or trigger a targeted media content based on the demographics and other related details, generate an alert to staff to check for customer needs based on customer wait time crossing a threshold, and creating and displaying a target media content with offers and discounts based on high wait time and relevant static.

Weather information may include, for example, weather data based on zip code. Weather information may be applied to the rules or AI model for predictive analysis and for dynamic media content creation or triggering based on analytics of weather data along with other data.

POS information may include, for example, a retailer's data for transactions happening over a POS machine. POS information may include, for example, customer purchase history based on transaction data, location of purchase, items purchased and corresponding quantity, customer purchasing habits, retail store sales information, store conversion rate. POS information may be applied to the rules or AI model to generate analytical reports based on demographics of people visiting a location 110, and to generate or trigger a targeted media content based on the demographics and other related details.

Catalog information may include, for example, a retailer's product catalog data, that includes details of products and their pricing information. Campaign data may also be provided with the product catalog data, wherein the campaign data is data for special events or a specific time of the year. Inventory information may include, for example, inventory data of a retailer's location 110 and supply chain data. Catalog information may be applied to the rules or AI model to create or trigger media content based on product offerings in the catalog information, wherein offer, discount, up selling, and cross-selling messages may be included based on the analytics and the product catalog. The campaign information may be applied to the rules or AI model to create or trigger media content based on a campaign ran by the retailer.

CRM information may include, for example, customer related data such as customer location and loyalty information. Such information may come from, for example, a retailer's CRM or loyalty program data. CRM information may be applied to the rules or AI model in analytics based on customer demographics like age and gender, customer location information (e.g. zip code) that provides information about purchasing habits about people living in certain localities, and customer purchase history and preferences based on, for example, a loyalty program.

Event information may be, for example, data about past and/or future local events, sports games (e.g. the results of the games), etc. Event information may be applied to the rules or AI model to perform the predictive analysis based on past events, to create reports based on event data matched with sales, weather, location, etc., and to create and trigger media content based on the events.

Display location information may be, for example, information about a specific location of a display 280 within a store. Display location information may be applied to the rules or AI model to generate analytical reports based on demographics of people visiting a location 110, and to generate or trigger a targeted media content based on the demographics and other related details.

Store information may be, for example, information about a retailer's location 110 (e.g. store). For example, store information may include data of (1) location of the store, along with purchasing habits of people in that locality; (2) weather conditions around the store location; (3) Events happening around the store location; and (4) distance from other competitive stores. The store information may be applied to the rules or AI model to perform analytics based on the store data, and corresponding sales, weather, events, store traffic, and other data. As well as for creating and trigger media contents based on the data.

Retailer digital data may be, for example, data stored by a location 110 concerning a specific customer. For example, the data may include specific themes, images, videos, etc. for each specific customer in which data is provided. The retailer digital data may be applied to the rules or AI model to create and trigger messages utilizing the specific themes, images, videos, etc.

Sensor data may include, for example, RFID and beacon data. RFID data may include information relating to tracking products in a store that are tagged with RFID tags. Beacon data may include information related to location of customers maneuvering inside a store. Promotion data includes, for example, information about promotions applied on products within the location 110. The sensor data may be applied to the rules or AI model to generate analytical reports based on demographics of people visiting a location 110, and to generate or trigger a targeted media content based on the demographics and other related details. Additionally, the beacon data may be applied to the rules or AI model to build relation between a customer's in-store location, with other customer related data coming from other input sources (e.g. CRM, detection module 250, RFID, and locations of displays 280).

The AI models and rules sets of the present disclosure may output any type of information that may be used for selecting media content to display or creating media content, including the media content tags. In an embodiment, the media content tags may be media content creation recommendations and message creation recommendations.

The media content tags may include, for example, meta-tags that are information associated with an asset in the form of simple keywords. The meta-tags may be a subset of metadata and may be used for the purposes of denoting the subject matter of the asset. In an embodiment of the present disclosure, a media content tag may include, a probability factor, media content meta-tag, a product stock keeping unit (SKU) information, a product meta-tag, age information, gender information, weather information, and event ID information. The media content meta-tag may be a unique ID that identifies media content. The product meta-tag may be a unique tuple that identifies a product including, for example, the department, classification, and category of the product. The age information may be an age of a customer for whom the media content is targeted. The gender information may be a gender of a customer for whom the media content is targeted. The weather information may weather information for which the media content is targeted. The event information may be information for which the media content is targeted. The media content tags generated may be used by the ALP cloud 310 to generate optimized media content and trigger the playing of media content, and by the ALP system 210 to trigger the playing of media content.

An example of a media content tag for media content creation is provided below.

```
{
  <Hit Probability> 90%
  <Product SKU>
  <Asset Meta-tag> {Fashion, Coat, North Face}
  <age> 25-35
  <gender> Female
  <DS ID> DS101
},
{
  <Hit Probability> 50%
  <Product SKU>
  < Asset Meta-tag> {Fashion, Shoes, Adidas}
  <age> 25-35
  <gender> Female
  <DS ID> DS101
}
```

Another example of a media content tag for media content creation, generated using different input data, is provided below.

```
{
  <Hit Probability> 70%
  <Product SKU>
  < Asset Meta-tag> {Toys & Games, Video Games, PS4}
  <age> 15-25
  <gender> Male
  <DS ID> DS120
},
{
  <Hit Probability> 50%
  <Product SKU>
  < Asset Meta-tag> {Fashion, Polo, USPA}
  <age> 15-25
  <gender> Male
  <DS ID> DS120
},
{
  <Hit Probability> 30%
  <Product SKU>
  < Asset Meta-tag> {Fashion, Shades, Ray Ban}
  <age> 15-25
  <gender> Male
  <DS ID> DS120
}
```

An example of a media content tag for media content selection is provided below.

```
{
  <Hit Probability> 90%
  <Product SKU>
  <Message Meta-tag> MSG-2061 (it could be {Fashion, Coat, North Face})
  <age> 25-35
  <gender> Female
  <DS ID> DS101
},
{
  <Hit Probability> 50%
  <Product SKU>
  <Product Meta-tag> MSG-2761 (it could be { Fashion, Shoes, Adidas})
  <age> 25-35
  <gender> Female
  <DS ID> DS101
}
```

Another example of a media content tag for media content selection, generated using different input data, is provided below.

```
{
    <Hit Probability> 70%
    <Product SKU>
    <Product Meta-tag> MSG-101 {Toys & Games, Video Games, PS4}
    <age> 15-25
    <gender> Male
    <DS ID> DS120
},
{
    <Hit Probability> 50%
    <Product SKU>
    <Product Meta-tag> MSG-161 ({Fashion, Polo, USPA})
    <age> 15-25
    <gender> Male
    <DS ID> DS120
},
{
    <Hit Probability> 30%
    <Product SKU>
    <Product Meta-tag> MSG-186 ({Fashion, Shades, Ray Ban})
    <age> 15-25
    <gender> Male
    <DS ID> DS120
}
```

In an embodiment, the outputted media content tags may also be the inputs of the AI models. For example, the media content tags may be output by the CAM AI 327, illustrated in FIG. 3, for retraining the AI model(s) used by the CAM AI 327 and the AI model(s) to be used by the ALP system 210. In an embodiment, the AI model(s) may be retrained to achieve a specified level of lift, which may be a measure of performance of the AI model. The term "lift" refers to a ratio of target response divided by average response.

Figure 8:
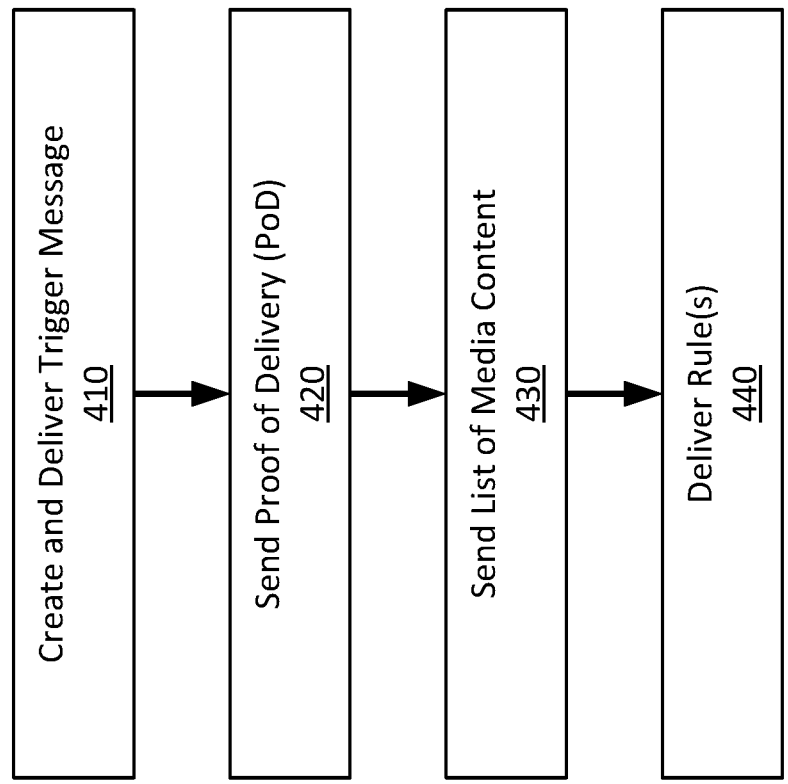
FIG. 8 is a diagram illustrating a method of the present disclosure.

Embodiments of the present disclosure may accomplish the method illustrated in FIG. 8. For example, referring to the embodiment illustrated in FIG. 2, the ALP cloud 310 may create one or more media content according to manual instructions of a user using a user terminal 140, or according to rules or an AI model stored in the ALP cloud 310, and deliver the media content to the CMS 240 via the CMS cloud 340 (step 410). Following, the CMS 240 may send a proof of delivery notification to the ALP cloud (step 420). The CMS 240 may also send a list of the media content stored in the CMS 240 to the ALP system 210 (step 430). The ALP cloud 310 may deliver a rule(s) or an AI model to the ALP system 210 that may be stored and used by the ALP cloud 310 to trigger certain media content to be played based on inputs to the rule(s) or the AI model.

In an embodiment, step 440 may be executed after step 420 to avoid triggering, before the CMS 240 receives the media content, the attempted playing of the media content based on the delivered rule(s) or AI model. In such a case, step 430 may be omitted. In an embodiment, the ALP system 210 can send an instruction to the CMS 240 as a trigger to display a specific media content on one or more displays 280 only if the specific media content is included in the list of media content received by the ALP system 210 in step 430. For example, the ALP system 210 may determine a media content to play based in part on the list of media content received. In such a case, step 420 may be omitted.

Embodiments of the present disclosure may accomplish the method illustrated in FIG. 9. For example, referring to FIGS. 2 and 5, one or more cameras 260 may capture video, including images of at least one of the individuals 270 (step 510). Following, the detection module 250 may process the images from the video to acquire demographic data of the at least one of the individuals 270 (step 520). Additionally, the ALP system 210 may receive external data 295 from the ALP cloud 310 and other data from devices 290 (e.g. mobile sensor data, RFID data, beacon data) (step 530), and apply such data to rules or an AI model stored in the ALP system 210 (step 540). In an embodiment, the ALP system 210 may apply at least the demographic data acquired to the rule engine/AI model 222, the rule engine containing the rules. The ALP system 210 may trigger a specified media content to play based on an output of the rules or the AI model (step 550). For example, the ALP system 210 may send an instruction to the CMS 240 as a trigger to display the specified media content on one or more of the displays 280 connected to the CMS 240.

FIGS. 10A-E illustrate diagrams for demonstrating a sequence of interactions between the ALP system 210 and the CMS 240 of an embodiment, for triggering the playing of media content when the CMS 240 is currently playing media content in accordance with a CMS playlist 600.

In an embodiment, the CMS 240 may be configured to create and schedule a CMS playlist 600 to be played by one or more of the displays, and manage the media content list within the CMS playlist 600. The ALP system 210 may be configured to send a trigger to the CMS 240 for selecting a media content that resides within or outside the CMS playlist 600 for playing.

Based on information received from various data sources, the ALP system 210 selects the appropriate media content to be played and sends a trigger every predetermined time interval (e.g. every 1 second) to the CMS 240 to play a media content. The CMS 240 may ignore the triggers until a predetermined time period before a currently played media content ends, wherein the predetermined time period can be changed based on performance of the system. For example, with reference to FIG. 10A, the CMS 240 may accept a trigger at (N−1)th second of a currently played media content 610, wherein N is the length of the media content, and ignore the triggers received before the (N−1)th second of the currently played media content 610.

Based on the trigger being accepted, the CMS 240 may play the media content for which it has received the trigger. For example, with reference to FIG. 10B, the CMS 240 may play the media content 620 if the trigger received at (N−1)th second of the media content 610 played in FIG. 10A is for media content 620.

In case the CMS 240 does not receive a trigger at (N−1) sec of a currently played media content, the CMS 240 may accept the trigger received at a different predetermined time frame (e.g. (N−2) sec of a currently played media content) and play the media content referenced by the trigger, wherein such predetermined time period can be changed based on performance of the system. However, if the CMS 240 does not receive a trigger at the different time frame (e.g. (N−2) sec of a currently played media content), the CMS 240 may cause a next media content in the CMS playlist 600 to be played based on rules. For example, the CMS 240 may cause a lowest ordered media content of the CMS playlist 600 to play that was not previously played, a lowest ordered media content of the CMS playlist 600 to play that was not previously automatically triggered by the ALP system 210, or the next ordered media content of the CMS playlist 600 relative to the presently played media content. For example, with reference to FIG. 10C, the CMS 240 may play media content 630, the second media content in the CMS playlist 600, since media content 630 is the earliest media content in the CMS playlist 600 that has not been previously played. Additionally, with reference to FIG. 10D, the CMS 240 may play media content 640, the third media content in the CMS playlist 600, in a case where a trigger was not received at (N−1) sec and (N−2) sec of the played media content 630.

In further reference to FIG. 10D, based on the trigger not being received at (N−1) sec of the played media content 640 but a trigger being received at (N−2) sec of the played media content 640, the CMS 240 may play the media content for which it has received the trigger. For example, with reference to FIG. 10E, the CMS 240 may play the media content 650 if the trigger received at (N−2)th second of the media content 640 played in FIG. 10D is for media content 650.

In embodiments of the present disclosure, each of the ALP system 210, the CMS 240, and the cloud services (including the CAM 325, the ME module 315, and the CMS cloud 340) may be implemented by at least one processor. For example, in an embodiment, the ALP system and the CMS 240 may be implemented by the same or separate at least one first processor, and the CAM 325, ME module 315, and the CMS cloud 340 of the cloud services may be implemented by the same or separate at least one second processor.

Aspects of the present disclosure relating to the creation of new media content and the triggering of playing of media content may achieve a benefit of enabling media content that is more in-line to specific customer segment needs to be created and played. Accordingly, some embodiments of the present disclosure may cause created and triggered media content to be more engaging, thus potentially leading to more sales in stores. Moreover, by providing individuals with targeted product and service information in the form of media content, the individuals engagement and loyalty may increase. Accordingly, some embodiments of the present disclosure result in the enhancement of customer experience (e.g. impressions), thus leading to higher sales for retailers. Also, some embodiments of the present disclosure enable users to understand who is in a store or aisle at a specific time, the triggering of the relevant media content to be played, the users to understand the impact of media content on individuals, and the prediction of what media content will be most relevant to the individuals.

The whole or part of the example embodiments disclosed above can be described as, but not limited to, the following supplementary notes.

[Supplemental Note 1]
A device comprising:
a memory having program instructions stored therein; and
at least one processor configured to execute the program instructions to control the device to:
connect via a wide area network to a remote system,
receive a rule set or an artificial intelligence (AI) model from the remote system,
select media content from a plurality of media content based on applying demographics data to the rule set or AI model, and
cause, based on an output of the rule set or AI model, a display, that is local to the device, to display the media content.

[Supplemental Note 2]
The device of SUPPLEMENTAL NOTE 1 wherein the at least one processor is further configured to obtain customer demographics data as the demographic data based on sensor data from at least one sensor, and apply the customer demographics data to the rule set or AI model.

[Supplemental Note 3]
The device of SUPPLEMENTAL NOTE 1 or 2, wherein the at least one processor is further configured to obtain data from at least one from among a mobile sensor, a radio frequency identification device, and a beacon.

[Supplemental Note 4]
A system comprising:
the device according to SUPPLEMENTAL NOTE 2; and
the at least one sensor, wherein
the at least one sensor includes a first camera and a second camera,
the first camera is located in a vicinity of the display, and
the second camera is located in a position, away from the display.

[Supplemental Note 5]
The device of SUPPLEMENTAL NOTE 2, wherein the at least one processor is configured to send, to the remote system, the customer demographics data.

[Supplemental Note 6]
The device of SUPPLEMENTAL NOTE 5, wherein
the at least one processor is configured to send, to the remote system, only a portion of the customer demographics data that is obtained by the at least one processor, such that an amount of the customer demographics data sent to the remote system by the at least one processor is less than a total amount of the customer demographics data obtained by the at least one processor.

[Supplemental Note 7]
The device of SUPPLEMENTAL NOTE 1 or 5, wherein
the at least one processor is further configured to receive, from the remote system, external data including at least one from among event data, weather data, and point of sale (POS) data, and select the media content from the plurality of media content based on applying the demographics data and the external data to the rule set or AI model.

[Supplemental Note 8]
The device of SUPPLEMENTAL NOTE 1 or 5, wherein
the at least one processor is configured to receive, from the remote system, an updated rule of the rule set, an updated rule set, or an updated AI model, that is updated based on the customer demographics data sent to the remote system, and is further configured to cause the media content from the plurality of media content to be displayed on the display, based on the updated rule, the updated rule set, or the updated AI model.

[Supplemental Note 9]
The device of SUPPLEMENTAL NOTE 1-8, wherein
the plurality of media content is stored in memory that is external to the device, and the at least one processor is configured to cause, based on the output of the rule set or AI model, the display to display the media content from the plurality of media content that is stored in the memory that is external to the device.

[Supplemental Note 10]
A system comprising:
the device according to SUPPLEMENTAL NOTE 1, 4, 5, or 6; and
a content management system (CMS) connected by a local network with the device, wherein
the device is configured to receive the rule set or AI model from the remote system, select the media content from the plurality of media content based on applying the demographic data to the rule set or AI model, and send, based on the output of the rule set or AI model, a signal to the CMS to display the media content from the plurality of media content, and the CMS comprises at least one processor and a memory, and is configured to receive the plurality of media content from the remote system, store the plurality of media content in the memory of the CMS, and cause, based on the signal from the ALP appliance, the display to display the media content.

[Supplemental Note 11]

The system of SUPPLEMENTAL NOTE 10, wherein
the CMS is configured to send a list of the plurality of media content stored by the CMS to the device, and
the device is configured to send the signal to the CMS to display the media content from the plurality of media content, based on the list of the plurality of media content being previously received by the device.

[Supplemental Note 12]

The system of SUPPLEMENTAL NOTE 10 or 11, wherein
the device is configured to send a plurality of signals, including the signal, to the CMS to trigger the CMS to display one or more of the plurality of media content on the display, each of the plurality of signals sent at a different time, and
the CMS is configured to receive the plurality of signals, while playing media content of a playlist on the display, and further configured to:
 ignore each of the plurality of signals received prior to a first predetermined time of the media content of the playlist played,
 in a case where one of the plurality of signals is received at a second predetermined time of the media content of the playlist played, later than the first predetermined time, play one of the plurality of media content based on the one of the plurality of signals received,
 in a case where none of the plurality of signals is received at the second predetermined time and the one of the plurality of signals is received at the first predetermined time, play the one of the plurality of media content based on the one of the plurality of signals received, and
 in a case where none of the plurality of signals is received at the first predetermined time and the second predetermined time, play other media content of the playlist based on a position of the other media content within the playlist.

[Supplemental Note 13]

A system comprising:
a device comprising at least one processor and a memory; and
a remote system configured to communicate with the device via a wide area network, wherein
the remote system is configured to create a rule set or AI model and send the rule set or AI model via the wide area network to the device, the rule set or AI model configured for selecting media content among a plurality of media content for displaying on a display, that is local to the device, and
the device is configured to select the media content from the plurality of media content based on applying demographics data to the rule set or AI model, and cause, based on an output of the rule set or AI model, the display to display the media content.

[Supplemental Note 14]

The system of SUPPLEMENTAL NOTE 13, wherein
the remote system is further configured to receive at least a portion of the demographics data obtained by the device, and update the rule set or AI model sent to the device based on the portion of demographics data received by the remote system from the device.

[Supplemental Note 15]

The system of SUPPLEMENTAL NOTE 13 or 14, wherein the remote system is further configured receive external data including at least one from among event data, weather data, and point of sale (POS) data, and send the external data to the device, and
the device is configured to select the media content based on applying the demographics data and the external data to the rule set or AI model.

[Supplemental Note 16]

The system of SUPPLEMENTAL NOTE 13, 14, or 15, wherein
the remote system is further configured to create new media content based on the portion of demographics data received by the remote system from the device, and send the new media content to a content management system (CMS), that is connected locally with the device and the display, to be stored in memory of the CMS device as a part of the plurality of media content.

[Supplemental Note 17]

The system of SUPPLEMENTAL NOTE 13, 14, 15, or 16, wherein
the remote system is further configured to create customer insights for display on a user display, based on the portion of demographics data received by the remote system from the device.

[Supplemental Note 18]

The system of SUPPLEMENTAL NOTE 13, 14, 15, 16, or 17, wherein
the remote system is configured to receive a proof of delivery (PoD) notification from a content management system (CMS), that is connected locally with the device and the display, and send the rule set or AI model via the wide area network to the device based on previously receiving the PoD notification.

[Supplemental Note 19]

A method performed by a device comprising at least one processor and a memory, the device connected via a wide area network to a remote system, the method comprising:
receiving a rule set or artificial intelligence (AI) model from the remote system;
selecting media content from a plurality of media content based on applying demographics data to the rule set or AI model; and
causing, based on an output of the rule set or AI model, a display, that is local to the device, to display the media content.

[Supplemental Note 20]

The method of SUPPLEMENTAL NOTE 19, further comprising:
obtaining the demographics data based on sensor data from at least one sensor that is connected locally with the at least one processor of the device.

[Supplemental Note 21]

The method of SUPPLEMENTAL NOTE 19 or 20, further comprising:
uploading, to the remote system, at least a portion of the demographics data obtained by the device.

[Supplemental Note 22]

The method of SUPPLEMENTAL NOTE 19, 20, or 21, further comprising:
downloading, from the remote system, external data including at least one from among event data, weather data, and point of sale (POS) data, wherein the selecting comprises selecting the media content from the plurality of media content based on applying the demographics data and the external data to the rule set or AI model. As used herein, the term component is intended to be broadly construed as hardware, firmware, or a combination of hardware and software.

The foregoing disclosure provides illustration and description, but is not intended to be exhaustive or to limit the implementations to the forms explicitly described. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of embodiments of the present disclosure.

Even though combinations of features are recited in the claims and/or disclosed in the specification, these combinations are not intended to limit the disclosure of possible implementations. Many of the described features may be combined in ways not explicitly recited in the claims and/or explicitly described in the above disclosure. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on" unless explicitly stated otherwise. The term "or" as used herein is an inclusive "or", and has a meaning equivalent to "and/or."

What is claimed is:

1. A system comprising:
   at least one memory having program instructions stored therein; and
   at least one processor configured to execute the program instructions to implement a device and a content management system (CMS) and control the system to:
   send, by the device and to the CMS, a plurality of signals each triggering the CMS to play on a first display that is local to and separate from the device, a respective one of a plurality of media content of a playlist including a first media content, each of the plurality of signals sent at a different time while the first media content of the playlist is played on the first display,
   ignore, by the CMS, each of the plurality of signals received prior to a first predetermined time of the played first media content of the playlist, and
   in a case where one of the plurality of signals is received at a second predetermined time of the played first media content of the playlist, later than the first predetermined time, play, by the CMS and on the first display, one of the plurality of media content of the playlist, based on the one of the plurality of signals received.

2. The system of claim 1, wherein the at least one processor is further configured to control the system to:
   in a case where none of the plurality of signals is received at the second predetermined time and the one of the plurality of signals is received at the first predetermined time, play, by the CMS and on the first display, the one of the plurality of media content of the playlist, based on the one of the plurality of signals received.

3. The system of claim 2, wherein the at least one processor is further configured to control the system to:
   in a case where none of the plurality of signals is received at the first predetermined time and the second predetermined time, play, by the CMS and on the first display, other media content of the playlist, based on a position of the other media content within the playlist.

4. The system of claim 1, wherein the at least one processor is further configured to control the system to:
   connect, by the device, via a wide area network to a remote system,
   receive, by the device, a rule set or an artificial intelligence (AI) model from the remote system,
   select, by the device, the first media content based on applying first demographics data to the rule set or AI model, and
   cause, by the device and based on a first output of the rule set or AI model, the first display to display the first media content.

5. The system of claim 4, wherein
   the at least one processor is further configured to obtain customer demographics data as the first demographics data based on sensor data from at least one sensor, and apply the customer demographics data to the rule set or AI model.

6. The system of claim 5, wherein
   the at least one processor is further configured to obtain, by the device, data from at least one from among a mobile sensor, a radio frequency identification device, and a beacon.

7. The system of claim 5, further comprising:
   the at least one sensor, wherein
   the at least one sensor includes a first camera and a second camera,
   the first camera is located in a vicinity of the first display, and
   the second camera is located in a position, away from the first display.

8. The system of claim 5, wherein
   the at least one processor is configured to send, by the device and to the remote system, the customer demographics data.

9. The system of claim 8, wherein
   the at least one processor is configured to send, by the device and to the remote system, only a portion of the customer demographics data that is obtained by the at least one processor, such that an amount of the customer demographics data sent to the remote system by the at least one processor is less than a total amount of the customer demographics data obtained by the at least one processor.

10. The system of claim 8, wherein
    the at least one processor is further configured to receive, by the device and from the remote system, external data including at least one from among event data, weather data, and point of sale (POS) data, and select the first media content based on applying the first demographics data and the external data to the rule set or AI model.

11. The system of claim 8, wherein
    the at least one processor is configured to receive, by the device and from the remote system, an updated rule of the rule set, an updated rule set, or an updated AI model, that is updated based on the customer demographics data sent to the remote system, and is further configured to cause the first media content to be displayed on the first display, based on the updated rule, the updated rule set, or the updated AI model.

12. The system of claim 4, wherein
the plurality of media content are stored in memory that is external to the device, and
the at least one processor is configured to cause, by the device and based on the first output of the rule set or AI model, the first display to display the first media content that is stored in the memory that is external to the device.

13. The system of claim 4, wherein
the CMS is connected by a local network with the device,
the device is configured to receive the rule set or AI model from the remote system, select the first media content based on applying the first demographics data to the rule set or AI model, and send, based on the first output of the rule set or AI model, a first signal to the CMS, the first signal triggering the CMS to play the first media content on the first display, and
the CMS is configured to receive the first media content from the remote system, store the first media content in memory of the CMS, and cause, based on the first signal from the device, the first display to display the first media content.

14. The system of claim 13, wherein
the CMS is further configured to send to the device, the playlist including the first media content stored by the CMS, and
the device is configured to send the first signal, based on the playlist being previously received by the device.

15. A method performed by a system comprising at least one memory having program instructions stored therein and at least one processor configured to execute the program instructions to implement a device and a content management system (CMS), the method comprising:
receiving, by the CMS and from the device, a plurality of signals each triggering the CMS to play on a first display that is local to and separate from the device, a respective one of a plurality of media content of a playlist including a first media content, each of the plurality of signals sent at a different time while the first media content of the playlist is played on the first display;
ignoring, by the CMS, each of the plurality of signals received prior to a first predetermined time of the played first media content of the playlist; and
in a case where one of the plurality of signals is received at a second predetermined time of the played first media content of the playlist, later than the first predetermined time, playing, by the CMS and on the first display, one of the plurality of media content of the playlist, based on the one of the plurality of signals received.

16. The method of claim 15, further comprising:
in a case where none of the plurality of signals is received at the second predetermined time and the one of the plurality of signals is received at the first predetermined time, playing, by the CMS and on the first display, the one of the plurality of media content of the playlist, based on the one of the plurality of signals received.

17. The method of claim 16, further comprising:
in a case where none of the plurality of signals is received at the first predetermined time and the second predetermined time, playing, by the CMS and on the first display, other media content of the playlist, based on a position of the other media content within the playlist.

18. A device comprising:
a memory having program instructions stored therein; and
at least one processor configured to execute the program instructions to control the device to:
send a plurality of signals each triggering playing on a first display that is local to and separate from the device, a respective one of a plurality of media content of a playlist including a first media content, each of the plurality of signals sent at a different time while the first media content of the playlist is played on the first display,
wherein each of the plurality of signals received prior to a first predetermined time of the played first media content of the playlist is ignored, and
in a case where one of the plurality of signals is received at a second predetermined time of the played first media content of the playlist, later than the first predetermined time, one of the plurality of media content of the playlist is played on the first display, based on the one of the plurality of signals received.

19. The device of claim 18, wherein
in a case where none of the plurality of signals is received at the second predetermined time and the one of the plurality of signals is received at the first predetermined time, the one of the plurality of media content of the playlist is played on the first display, based on the one of the plurality of signals received.

20. The device of claim 19, wherein
in a case where none of the plurality of signals is received at the first predetermined time and the second predetermined time, other media content of the playlist is played on the first display, based on a position of the other media content within the playlist.

* * * * *